(12) United States Patent
Anderson et al.

(10) Patent No.: US 9,704,165 B2
(45) Date of Patent: Jul. 11, 2017

(54) SYSTEMS AND METHODS FOR DETERMINING VALUE OF SOCIAL MEDIA PAGES

(75) Inventors: James V. Anderson, Atlanta, GA (US);
John B. Nolt, Atlanta, GA (US);
Michael J. Strutton, Villa Rica, GA (US); Wenchang Yan, Duluth, GA (US); Sriti Kumar, Atlanta, GA (US);
Robert M. Maury, Alpharetta, GA (US); Paul M. Broft, Atlanta, GA (US);
Maria F. Arscott, Atlanta, GA (US);
Nancy M. Lim, Atlanta, GA (US);
Jason C. Reynolds, Covington, GA (US); Joe Kearney, Smyrna, GA (US);
John Schult, Buford, GA (US);
Melinda M. Weathers, Smyrna, GA (US); Chad Estes, Decatur, GA (US);
Erica M. Stanley, Atlanta, GA (US);
Geoffrey Hom, Alpharetta, GA (US);
Gregory K. Dunn, Atlanta, GA (US);
Horace Williams, II, Atlanta, GA (US);
Matt White, Roswell, GA (US);
Reginald R. Bradford, Atlanta, GA (US); Andrei Erdoss, Austell, GA (US); Andrew Robert Dorr, Marietta, GA (US); Brian Culler, Atlanta, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/105,713

(22) Filed: May 11, 2011

(65) Prior Publication Data
US 2011/0282943 A1 Nov. 17, 2011

Related U.S. Application Data

(60) Provisional application No. 61/333,647, filed on May 11, 2010.

(51) Int. Cl.
*G06F 15/16* (2006.01)
*G06Q 30/02* (2012.01)
(Continued)

(52) U.S. Cl.
CPC ............. *G06Q 30/02* (2013.01); *G06Q 10/06* (2013.01); *G06Q 10/107* (2013.01); *H04L 43/04* (2013.01);
(Continued)

(58) Field of Classification Search
CPC ........ G06Q 30/02; G06Q 50/01; G06Q 30/06; G06Q 10/06; G06Q 30/0201; G06Q 40/06;
(Continued)

(56) References Cited

U.S. PATENT DOCUMENTS

| 5,749,081 A | 5/1998 | Whitels |
| 6,363,392 B1 | 3/2002 | Halstead |

(Continued)

FOREIGN PATENT DOCUMENTS

WO   WO 2012/058408   5/2012

OTHER PUBLICATIONS

Christina Warren, How to: Measure Social Media ROI, Oct. 27, 2009, pp. 4-24. http://mashable.com/2009/10/27/social-media-roi/.*

(Continued)

*Primary Examiner* — Oleg Survillo
(74) *Attorney, Agent, or Firm* — Vista IP Law Group, LLP

(57) ABSTRACT

Systems and methods for evaluating the effectiveness of social media pages. Users of social media systems review (Continued)

High-level overview of Social Media Page Evaluator (SMPE)

and publish various kinds of content on social media pages, including various messages, audio clips, video clips, polls, web links, etc. A social media page evaluation system hosted on a physical server or a cloud receives a social media page that is to be evaluated, and provides results of an evaluation process. The evaluation process involves processing of various criteria and parameters that characterize engagements and interactions between users of social media pages. Results of an evaluation process include qualitative and quantitative attributes in connection with evaluating the effectiveness of published content on social media pages. Such results are useful for purposes of enriching content in social media pages, resulting in greater network traffic due to increased engagements and interaction among users of social media pages.

27 Claims, 9 Drawing Sheets

(51) Int. Cl.
  *H04L 12/26* (2006.01)
  *G06Q 10/06* (2012.01)
  *G06Q 10/10* (2012.01)
  G06Q 50/00 (2012.01)
  H04L 29/08 (2006.01)
(52) U.S. Cl.
  CPC .............. *G06Q 50/01* (2013.01); *H04L 43/02* (2013.01); *H04L 67/22* (2013.01)
(58) Field of Classification Search
  CPC .... G06Q 10/10; G06Q 30/0247; G06Q 30/08; G06Q 50/08; G06Q 10/00; G06Q 10/06313; G06Q 30/0222; G06Q 30/0234; G06Q 30/0235; G06Q 30/0239; G06Q 30/0242; G06Q 30/0641; G06Q 40/02; G06Q 40/04; G06Q 10/06375; G06Q 10/107; G06Q 10/20; G06Q 30/0211; G06Q 30/0212; G06Q 30/0282; G06Q 30/0601; G06Q 30/0631; G06Q 40/12; G06Q 50/18; G06Q 20/388; G06Q 30/0241; G06Q 30/0245; G06Q 30/0609; G06Q 40/00; G06Q 50/22; G06Q 10/0635; G06Q 10/0637; G06Q 30/0256; G06Q 30/0269; G06Q 50/165; G06Q 10/04; G06Q 10/063; G06Q 10/0639; G06Q 10/08; G06Q 10/087; G06Q 30/0277; G06F 17/30864; G06F 17/212; G06F 17/30905; G06F 17/30687; G06F 17/30699; G06F 17/30707; G06F 17/30873; H04L 43/02; H04L 43/04; H04L 67/22
  USPC ............ 709/204, 205, 206, 225; 705/14, 66, 705/14.31; 707/709, 661, 710, 722, 723, 707/732, 748, 822, 827, 944, 999.01, 707/999.101, 999.104, E17.108, 711, 707/999.003, 999, 999.006
  See application file for complete search history.

(56) References Cited

U.S. PATENT DOCUMENTS

| | | | |
|---|---|---|---|
| 6,636,861 B1 | 10/2003 | Stack | |
| 8,214,272 B2 * | 7/2012 | Glassman | G06Q 30/02 370/229 |
| 8,606,792 B1 * | 12/2013 | Jackson | G06F 17/30699 707/748 |
| 2002/0169800 A1 * | 11/2002 | Sundaresan | G06F 17/30864 715/234 |
| 2003/0063072 A1 | 4/2003 | Brandenberg | |
| 2003/0120735 A1 | 6/2003 | Capiel | |
| 2004/0083133 A1 | 4/2004 | Nicholas et al. | |
| 2005/0018611 A1 * | 1/2005 | Chan et al. | 370/241 |
| 2005/0055341 A1 | 3/2005 | Haahr et al. | |
| 2005/0091202 A1 | 4/2005 | Thomas | |
| 2006/0026655 A1 | 2/2006 | Perez | |
| 2006/0085419 A1 | 4/2006 | Rosen | |
| 2006/0143081 A1 | 6/2006 | Argaiz | |
| 2006/0248045 A1 | 11/2006 | Toledano | |
| 2006/0294134 A1 | 12/2006 | Berkhim et al. | |
| 2007/0043617 A1 | 2/2007 | Stein | |
| 2007/0073937 A1 | 3/2007 | Feinberg | |
| 2007/0124432 A1 | 5/2007 | Holtzman et al. | |
| 2007/0150335 A1 * | 6/2007 | Arnett et al. | 705/10 |
| 2007/0214097 A1 | 9/2007 | Parsons et al. | |
| 2007/0250468 A1 | 10/2007 | Pieper | |
| 2007/0256033 A1 | 11/2007 | Hiler | |
| 2007/0282874 A1 * | 12/2007 | Metcalfe | G06F 17/3089 |
| 2007/0297641 A1 * | 12/2007 | Criddle et al. | 382/100 |
| 2008/0104679 A1 | 5/2008 | Craig | |
| 2008/0109245 A1 | 5/2008 | Gupta | |
| 2008/0109306 A1 | 5/2008 | Maigret et al. | |
| 2008/0114755 A1 | 5/2008 | Wolters et al. | |
| 2008/0168079 A1 | 7/2008 | Smith et al. | |
| 2008/0184135 A1 | 7/2008 | Washburn et al. | |
| 2008/0189254 A1 | 8/2008 | Cancel et al. | |
| 2008/0208911 A1 * | 8/2008 | Lee | G06Q 30/02 |
| 2008/0222295 A1 | 9/2008 | Robinson et al. | |
| 2008/0248815 A1 | 10/2008 | Busch | |
| 2008/0294624 A1 | 11/2008 | Kanigsberg et al. | |
| 2008/0319918 A1 | 12/2008 | Forlai | |
| 2009/0006371 A1 | 1/2009 | Denoue et al. | |
| 2009/0006388 A1 | 1/2009 | Ives et al. | |
| 2009/0017804 A1 | 1/2009 | Sarukkai | |
| 2009/0037412 A1 | 2/2009 | Bard et al. | |
| 2009/0048904 A1 | 2/2009 | Newton et al. | |
| 2009/0049070 A1 | 2/2009 | Steinberg | |
| 2009/0063284 A1 * | 3/2009 | Turpin et al. | 705/14 |
| 2009/0070412 A1 | 3/2009 | D'Angelo et al. | |
| 2009/0119173 A1 | 5/2009 | Parsons et al. | |
| 2009/0144392 A1 | 6/2009 | Wang et al. | |
| 2009/0198487 A1 | 8/2009 | Wong et al. | |
| 2009/0215469 A1 | 8/2009 | Fisher | |
| 2009/0216741 A1 | 8/2009 | Thrall et al. | |
| 2009/0222348 A1 | 9/2009 | Ransom et al. | |
| 2009/0222551 A1 * | 9/2009 | Neely | G06Q 30/02 709/224 |
| 2009/0259550 A1 * | 10/2009 | Mihelich | G06Q 30/02 705/14.42 |
| 2009/0319518 A1 | 12/2009 | Koudas et al. | |
| 2010/0063961 A1 | 3/2010 | Guiheneuf et al. | |
| 2010/0070448 A1 | 3/2010 | Omoigui | |
| 2010/0121857 A1 | 5/2010 | Elmore et al. | |
| 2010/0125563 A1 * | 5/2010 | Nair et al. | 707/709 |
| 2010/0146144 A1 * | 6/2010 | Audenaert et al. | 709/235 |
| 2010/0159965 A1 | 6/2010 | Pascal | |
| 2010/0218128 A1 | 8/2010 | Bonat et al. | |
| 2010/0228617 A1 | 9/2010 | Ransom et al. | |
| 2010/0250330 A1 | 9/2010 | Lam et al. | |
| 2010/0280860 A1 | 11/2010 | Iskold | |
| 2010/0318613 A1 | 12/2010 | Souza et al. | |
| 2010/0332330 A1 | 12/2010 | Goel et al. | |
| 2010/0332962 A1 * | 12/2010 | Hammer et al. | 715/205 |
| 2011/0004692 A1 | 1/2011 | Occhino et al. | |
| 2011/0066844 A1 | 3/2011 | O'Toole, Jr. | |
| 2011/0078188 A1 * | 3/2011 | Li et al. | 707/776 |
| 2011/0082858 A1 * | 4/2011 | Yu et al. | 707/727 |
| 2011/0099070 A1 | 4/2011 | Eliason | |
| 2011/0112899 A1 | 5/2011 | Strutton et al. | |
| 2011/0125550 A1 * | 5/2011 | Erhart et al. | 705/7.29 |
| 2011/0131504 A1 | 6/2011 | Shustef | |
| 2011/0153412 A1 * | 6/2011 | Novikov et al. | 705/14.42 |
| 2011/0231478 A1 | 9/2011 | Wheeler et al. | |
| 2011/0264736 A1 | 10/2011 | Zuckerberg et al. | |

(56) References Cited

U.S. PATENT DOCUMENTS

| | | | |
|---|---|---|---|
| 2011/0265011 A1 | 10/2011 | Taylor et al. | |
| 2011/0270649 A1* | 11/2011 | Kerho | 705/7.31 |
| 2011/0288917 A1 | 11/2011 | Wanek et al. | |
| 2011/0307312 A1* | 12/2011 | Goeldi | 705/14.6 |
| 2011/0313996 A1* | 12/2011 | Strauss et al. | 707/709 |
| 2012/0047011 A1 | 2/2012 | Rippetoe et al. | |
| 2012/0109751 A1 | 5/2012 | Binenstock et al. | |
| 2012/0110464 A1 | 5/2012 | Chen et al. | |
| 2012/0150989 A1 | 6/2012 | Portnoy et al. | |
| 2014/0074856 A1 | 3/2014 | Rao | |
| 2016/0048317 A1* | 2/2016 | Williams, II | G06Q 50/01 715/735 |

OTHER PUBLICATIONS

Justin Perkins, Is It Worth It? An ROI Calculator for Social Network Campaigns, Jul. 24, 2007, pp. 1-17 http://www.frogloop.com/social-network-calculator.*

Final Office Action dated Oct. 5, 2015 for related U.S. Appl. No. 13/195,677.

Advisory Action dated Dec. 21, 2015 for related U.S. Appl. No. 13/195,677.

Non-final Office Action dated Feb. 1, 2016 for related U.S. Appl. No. 12/859,675.

Butler, Christopher, A Practical Guide to Social Media, dated May 28, 2009 and published by Newfangled.com, downloaded from https://www.newfangled.com/a-practical-guide-to-social-media/ on Jan. 26, 2016 (hereinafter Butler).

Short Message Service, from Wikipedia, downloaded from https://en.wikipedia.org/wiki/Short_Message_Service on Jan. 25, 2016.

Non-final Office Action dated Mar. 10, 2016 for related U.S. Appl. No. 13/267,772.

Final Office Action dated Jun. 24, 2015 for U.S. Appl. No. 12/859,675.

Final Office Action dated Jul. 1, 2015 for U.S. Appl. No. 13/267,772.

Notice of Allowance and Fee(s) Due dated Aug. 5, 2015 for U.S. Appl. No. 12/563,529.

Final Office Action dated Aug. 19, 2015 for related U.S. Appl. No. 13/018,225.

Non-final Office Action dated Mar. 20, 2015 for U.S. Appl. No. 13/018,225.

How to Write Advertisements that Sell, author unknown, form System, the magazine of Business, dated 1912, downloaded from http://library.duke.edu/digitalcollections/eaa_Q0050/ on Feb. 21, 2015.

History of OOH, downloaded from http://www.oaaa.org/OutofHomeAdvertising/HistoryofOOH.aspx# on Mar. 13, 2015.

Non-final Office Action dated Apr. 8, 2015 for U.S. Appl. No. 13/195,677.

Damien, "The How to Guide to Add Facebook Social Plubins to Your WordPress Site", Apr. 28, 2010, from maketecheasier (downloaded Mar. 28, 2015 from http://www.maketecheasier.com/howto-guide-to-add-facebook-social-plugin-to-your-site/).

Non-final Office Action dated Apr. 14, 2015 for U.S. Appl. No. 12/563,529.

Final Office Action dated Sep. 19, 2016 for related U.S. Appl. No. 13/267,772.

Final Office Action dated Oct. 26, 2016 for related U.S. Appl. No. 13/195,677.

Final Office Action dated Dec. 27, 2016 for related U.S. Appl. No. 13/018,225.

Non-final Office Action dated May 3, 2016 for related U.S. Appl. No. 13/195,677.

Non-final Office Action dated May 16, 2016 for related U.S. Appl. No. 13/018,225.

HTML, from Wikipedia, downloaded from https://en.wikipedia.org/w/index.php?title=HTML&oldid=410415700 on May 10, 2016, and dated Jan. 27, 2011.

Final Office Action dated Jul. 8, 2016 for related U.S. Appl. No. 12/859,675.

20 Really Short URL Shorteners, by Webmasterish, at SingleFunction.com, downloaded from http://singlefunction.com/20-reallyshort-uri-shorteners/ on Jul. 4, 2016 and dated Mar. 4, 2009.

Sullivan, Danny, URL Shorteners: Which Shortening Service Should You Use?, at SearchEngineland.com, downloaded from https://web.archive.org/web/20090405074950/http:1/searchengineland.com/analysis-which-url-shortening-service-should-youuse-17204 on Jul. 4, 2016, dated Apr. 4, 2009, Archived on Apr. 5, 2009.

Purdy, Kevin, Make Your Own URL Shortening Service, at lifehacker.com, downloaded from http:1/lifehacker.com/5335216/make-your-own-url-shortening-service on Jul. 4, 2016 and dated Aug. 14, 2009.

ShortURL.com, author unknown, downloaded from http://www.shorturl.com on Jul. 4, 2016 (hereinafter ShortURL screenshot).

Ningthoujam, Palin, URL Toolbox: 90+ URL Shortening Services, from Mashable, downloaded from http://mashable.com/2008/02/01/uri-shortening-services/ on Jul. 5, 2016, dated Jan. 8, 2008.

Meta refresh, from Wikipedia, dated Jan. 16, 2006, downloaded Jul. 5, 2016 from https://en.wikipedia.org/w/index.php?title=Meta_refresh&oldid=35429258.

Meta refresh, from Wikipedia, dated Jun. 4, 2009, downloaded Jul. 5, 2016 from http://en.wikipedia.org/w/index.php?title=Meta_refresh&oldid=294423886.

Final Office Action for U.S. Appl. No. 12/880,882, dated Jan. 13, 2014.

Towards a New Multimedia Paradigm, Hoogeveen, ED-Media 95 Proceedings. 2005.

Non-Final Office Action for U.S. Appl. No. 12/563,529, dated Jul. 22, 2013.

Non-Final Office Action for U.S. Appl. No. 12/563,529, dated Sep. 8, 2011.

Final Office Action for U.S. Appl. No. 12/563,529, dated Nov. 7, 2013.

Final Office Action for U.S. Appl. No. 12/563,529, dated Apr. 6, 2012.

Non-Final Office Action for U.S. Appl. No. 12/880,882, dated May 23, 2013.

Non-Final Office Action for U.S. Appl. No. 12/859,675, dated Aug. 1, 2012.

Final Office Action for U.S. Appl. No. 12/859,675, dated Dec. 31, 2012.

Non-Final Office Action for U.S. Appl. No. 13/018,225, dated Feb. 4, 2013.

Final Office Action for U.S. Appl. No. 13/018,225, dated Aug. 7, 2013.

Non-Final Office Action for U.S. Appl. No. 12/563,529 dated Mar. 25, 2014.

Non-final Office Action dated Jul. 30, 2014 for U.S. Appl. No. 12/880,882.

Final Office Action dated Sep. 9, 2014 for U.S. Appl. No. 12/563,529.

Non-Final Office Action dated Dec. 5, 2014 for U.S. Appl. No. 13/267,772.

Non-Final Office Action dated Dec. 18, 2014 for U.S. Appl. No. 12/859,675.

Notice of Allowance and Fee(s) Due dated Jan. 22, 2015 for U.S. Appl. No. 12/880,882.

Corrected Notice of Allowance and Fee(s) Due dated Feb. 24, 2014 for U.S. Appl. No. 12/880,882.

Non-final Office Action dated Apr. 13, 2017 for related U.S. Appl. No. 12/859,675.

Non-final Office Action dated May 18, 2017 for related U.S. Appl. No. 13/267,772.

* cited by examiner

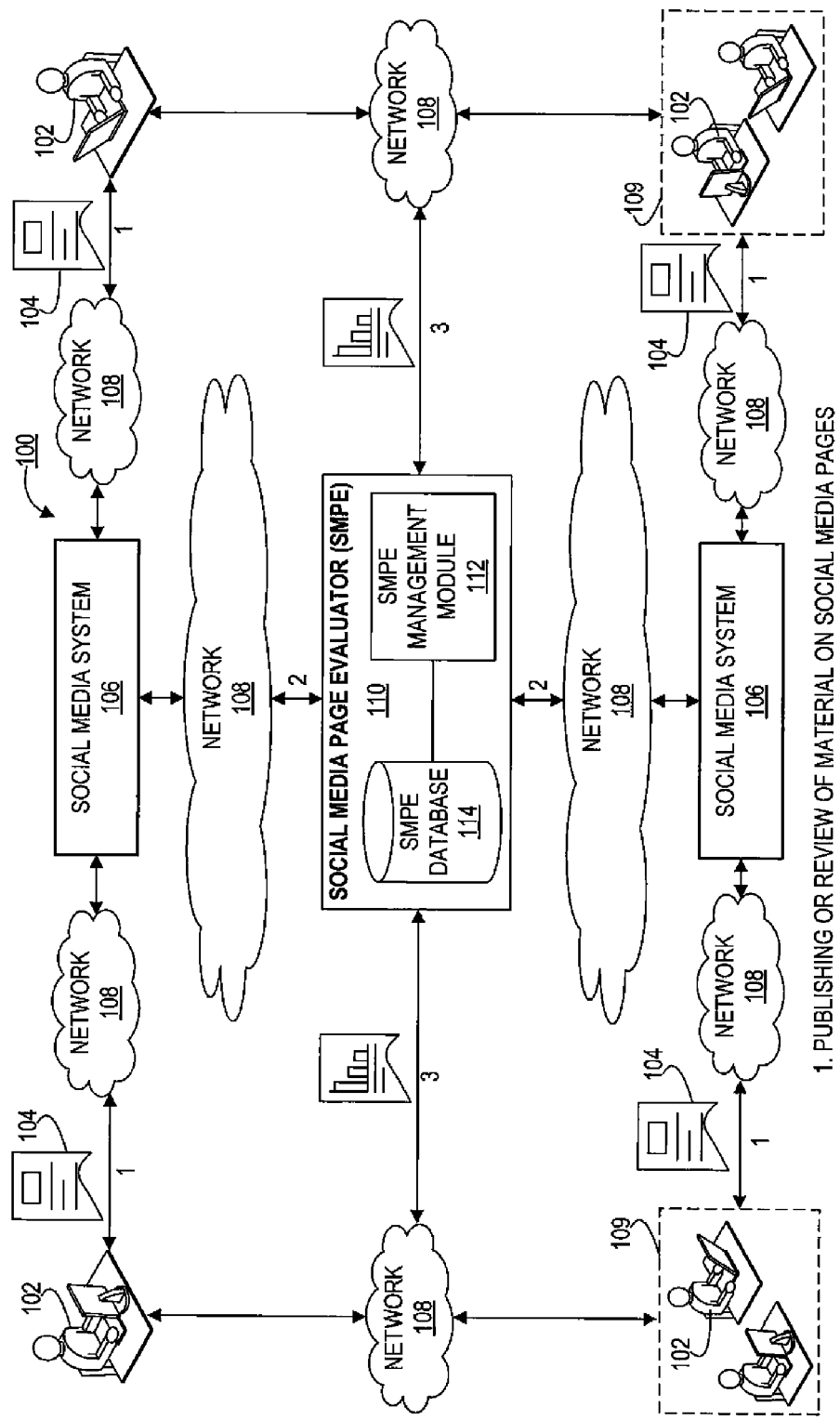
FIG. 1 – High-level overview of Social Media Page Evaluator (SMPE)

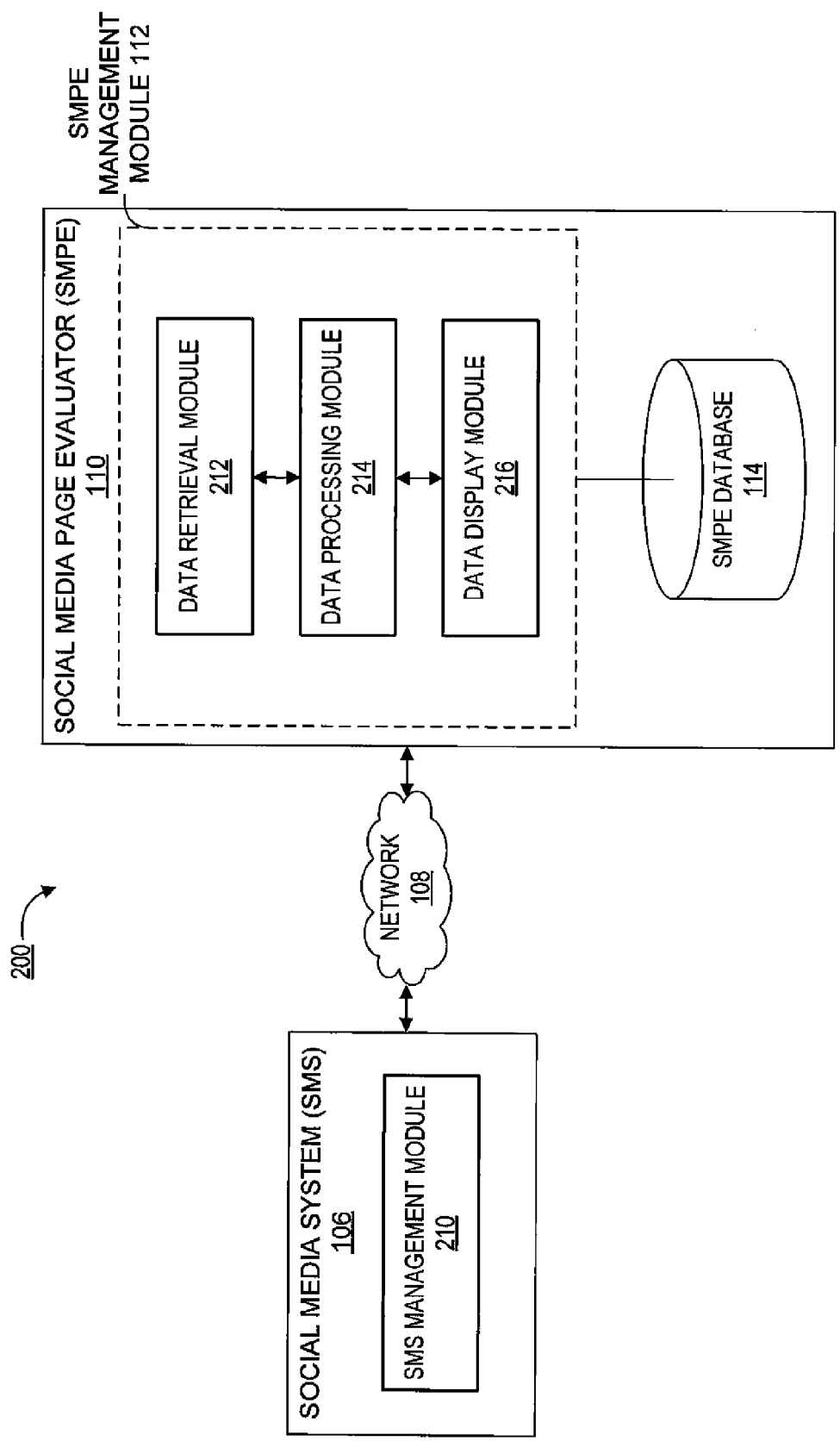
FIG. 2 – Exemplary SMPE System Architecture

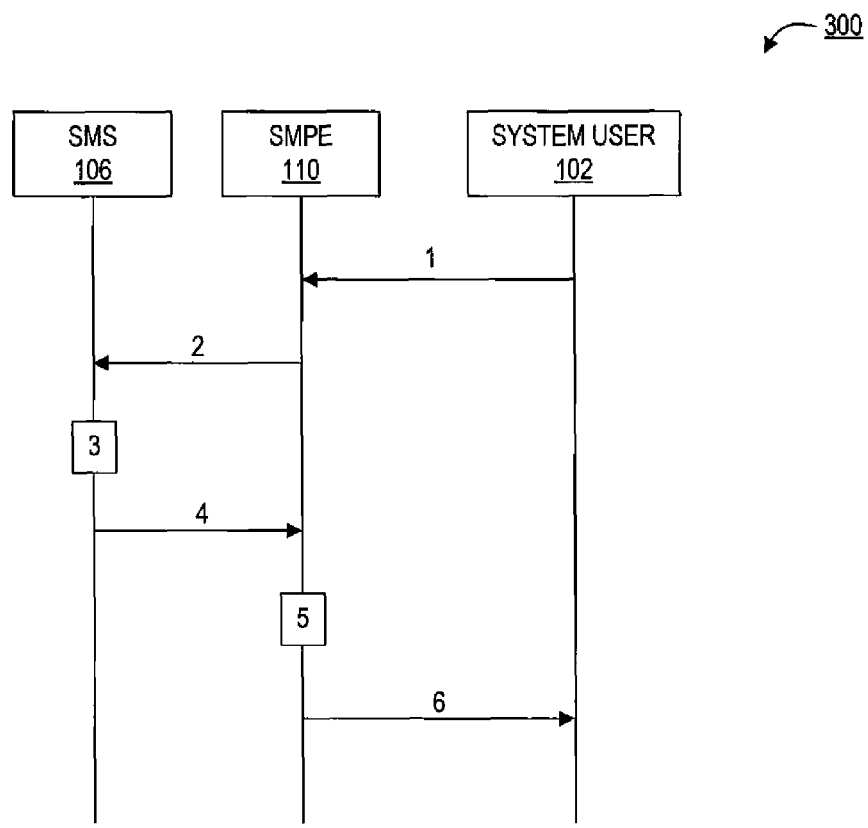
FIG. 3 – Exemplary Sequence Diagram Showing Interactions between Social Media System (SMS), Social Media Page Evaluator (SMPE), and System User

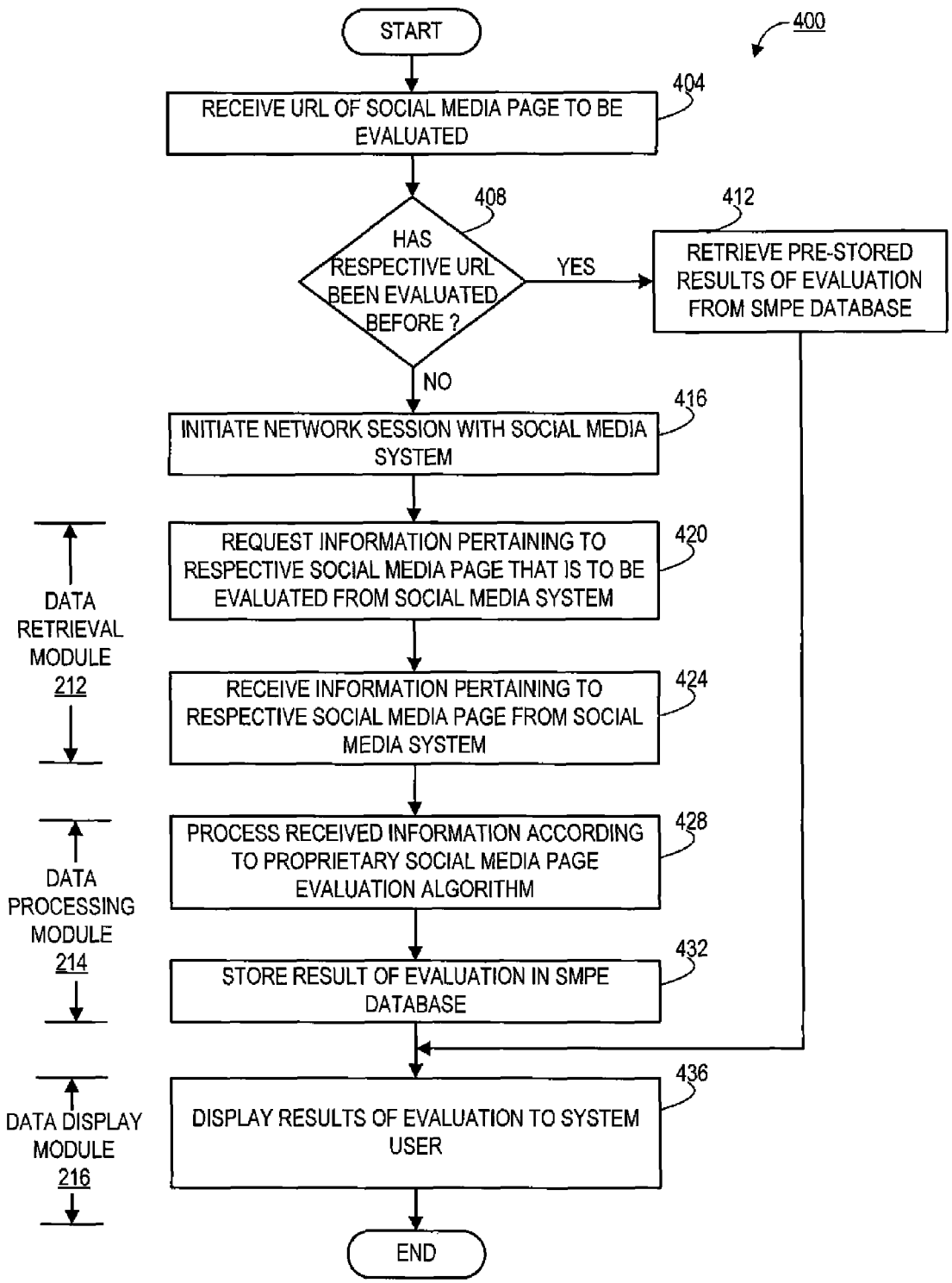
FIG. 4 – Exemplary Social Media Page Evaluation Process

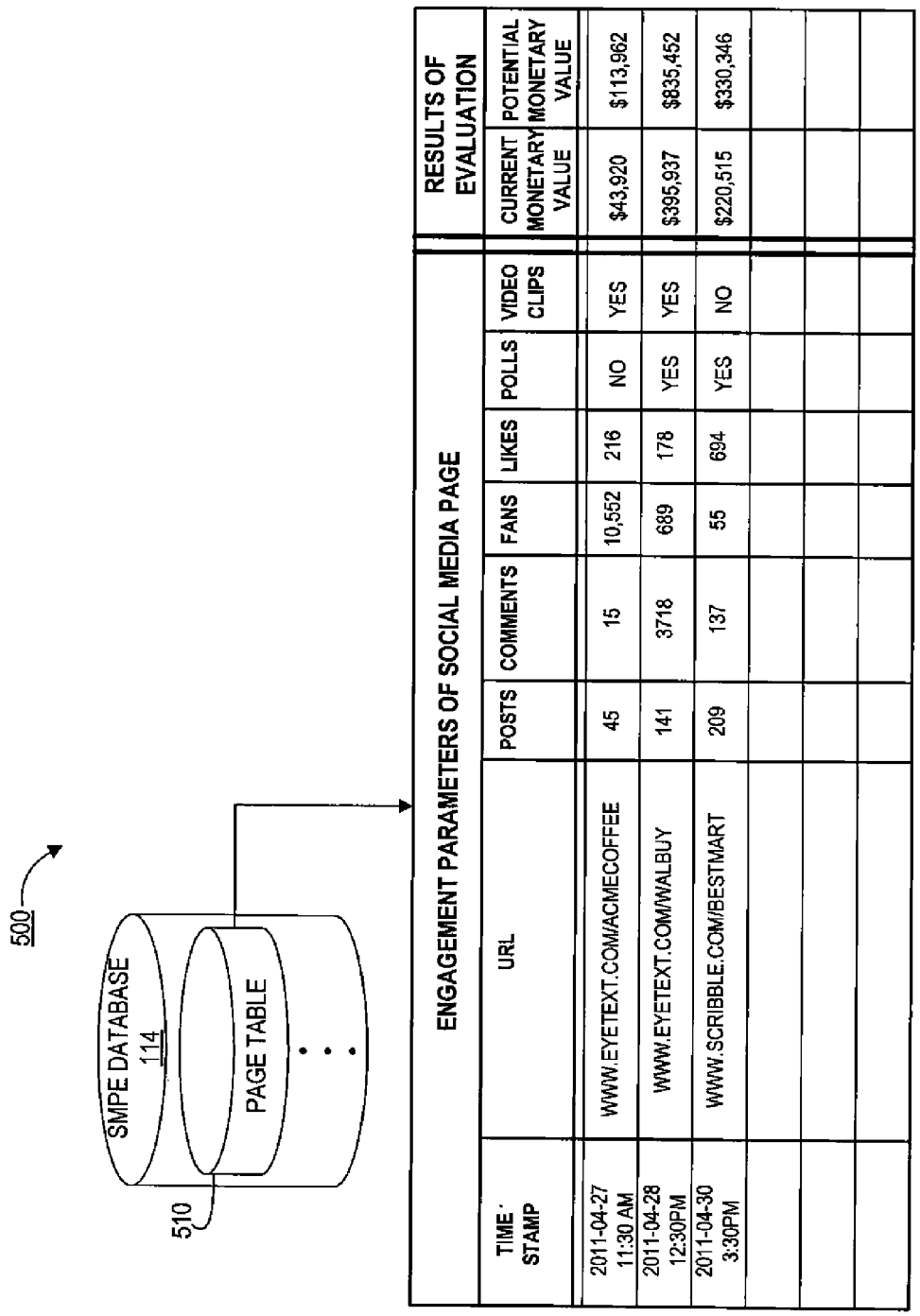
FIG. 5 – Exemplary SMPE Database Comprising a Page Table

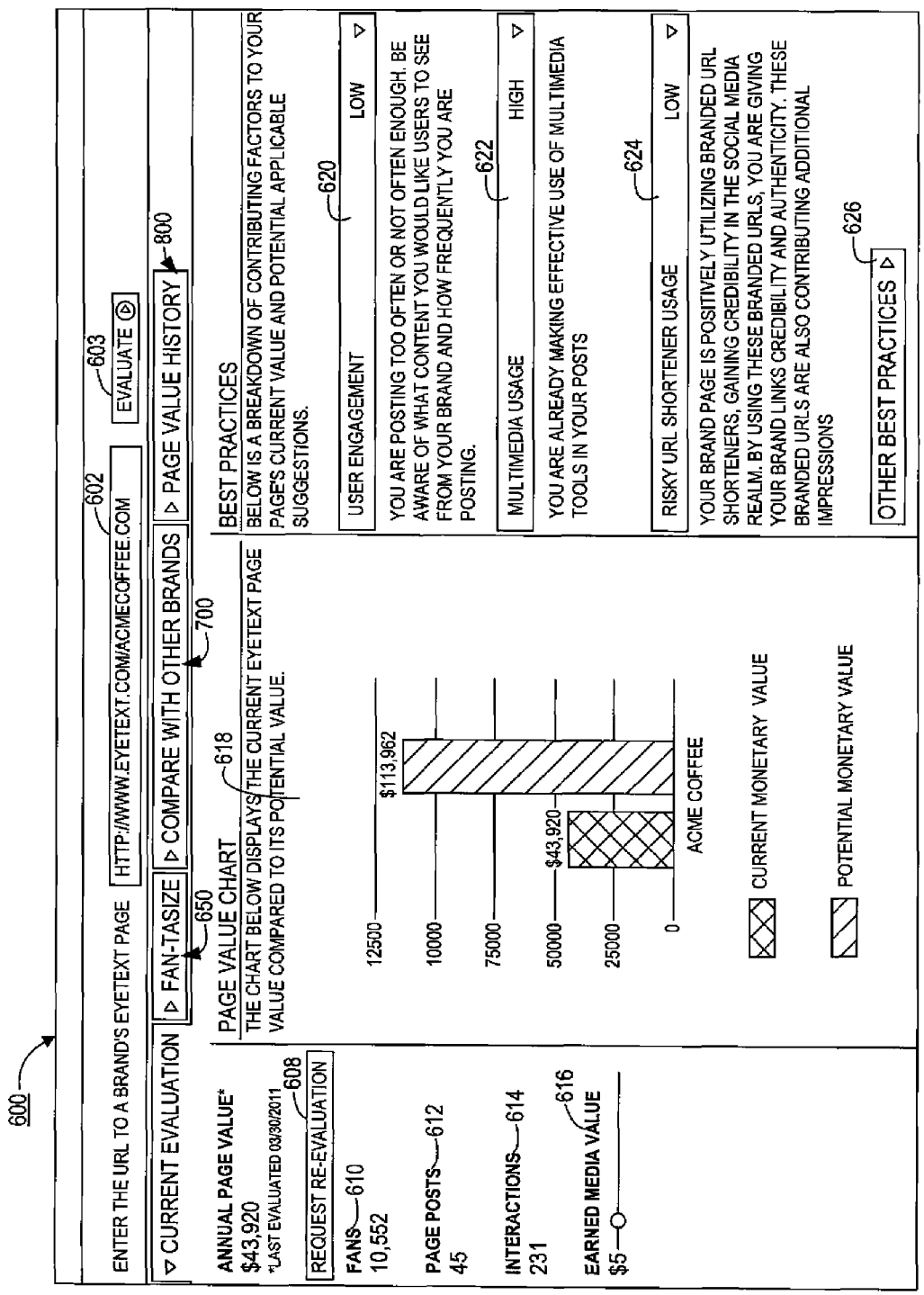
FIG. 6A - Exemplary SMPE Interface Displaying Results of Evaluation

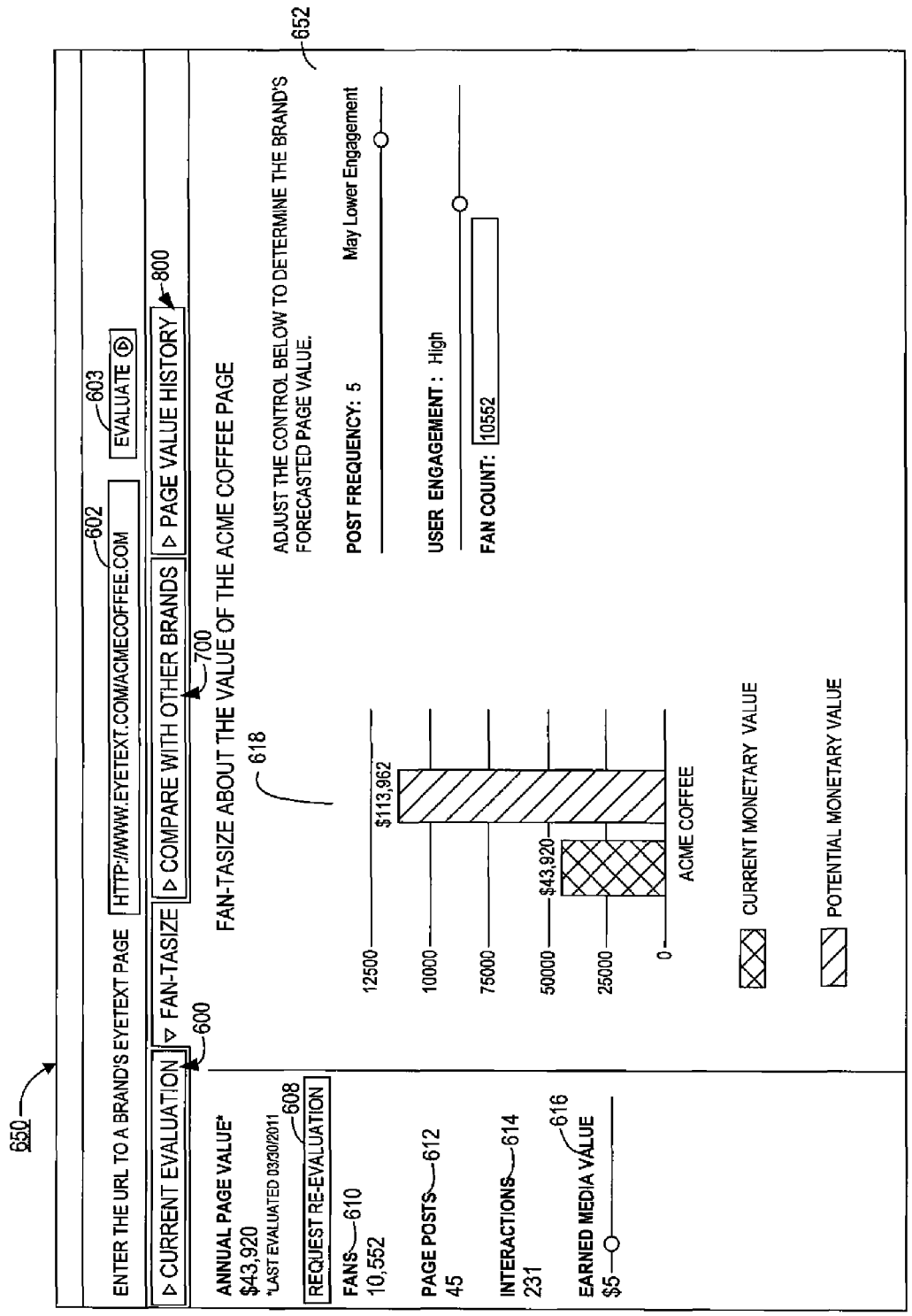
FIG. 6B - Exemplary SMPE Interface Displaying Results of Evaluation

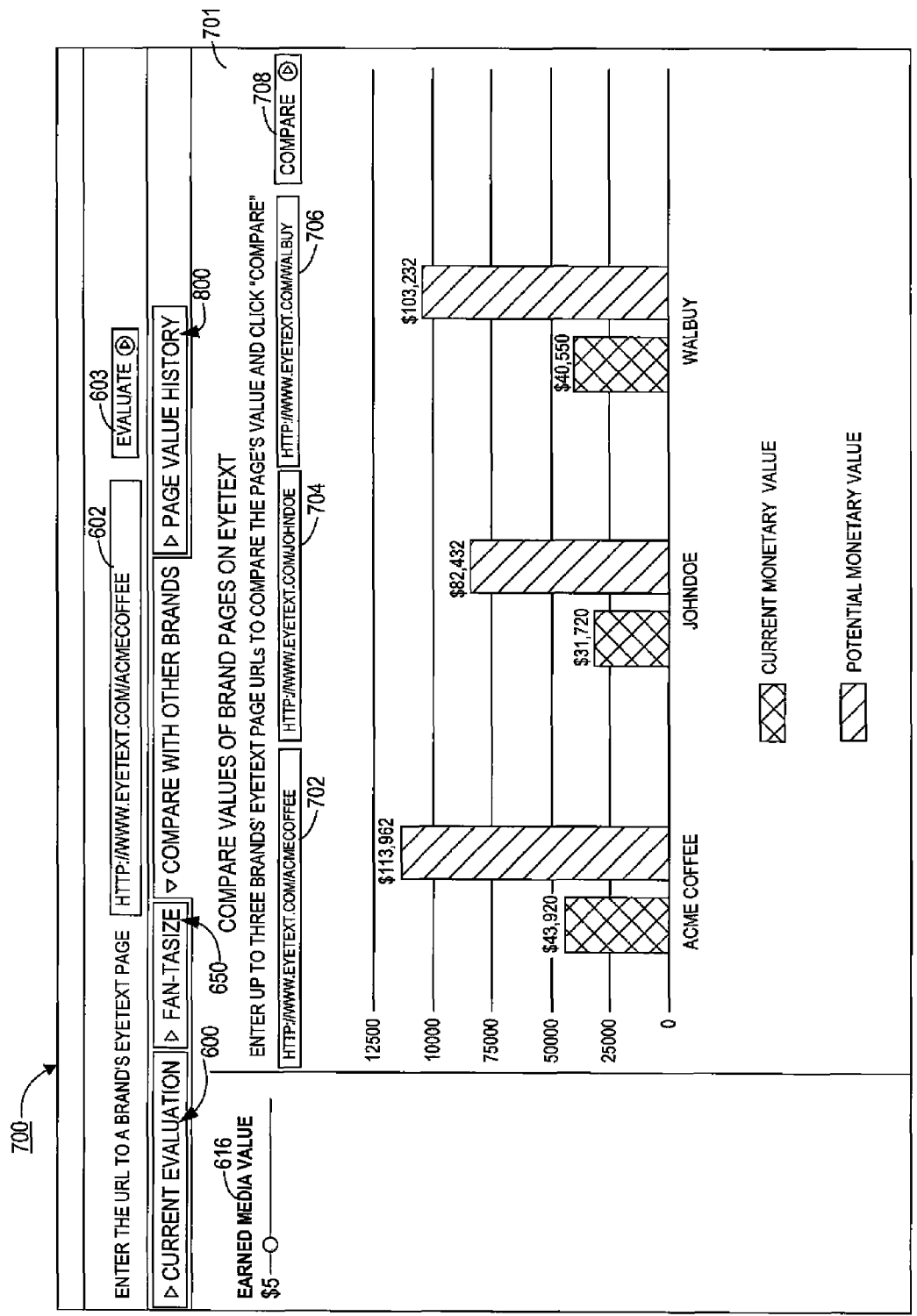
FIG. 7 - Exemplary SMPE Interface for Comparison of Several Social Media Pages

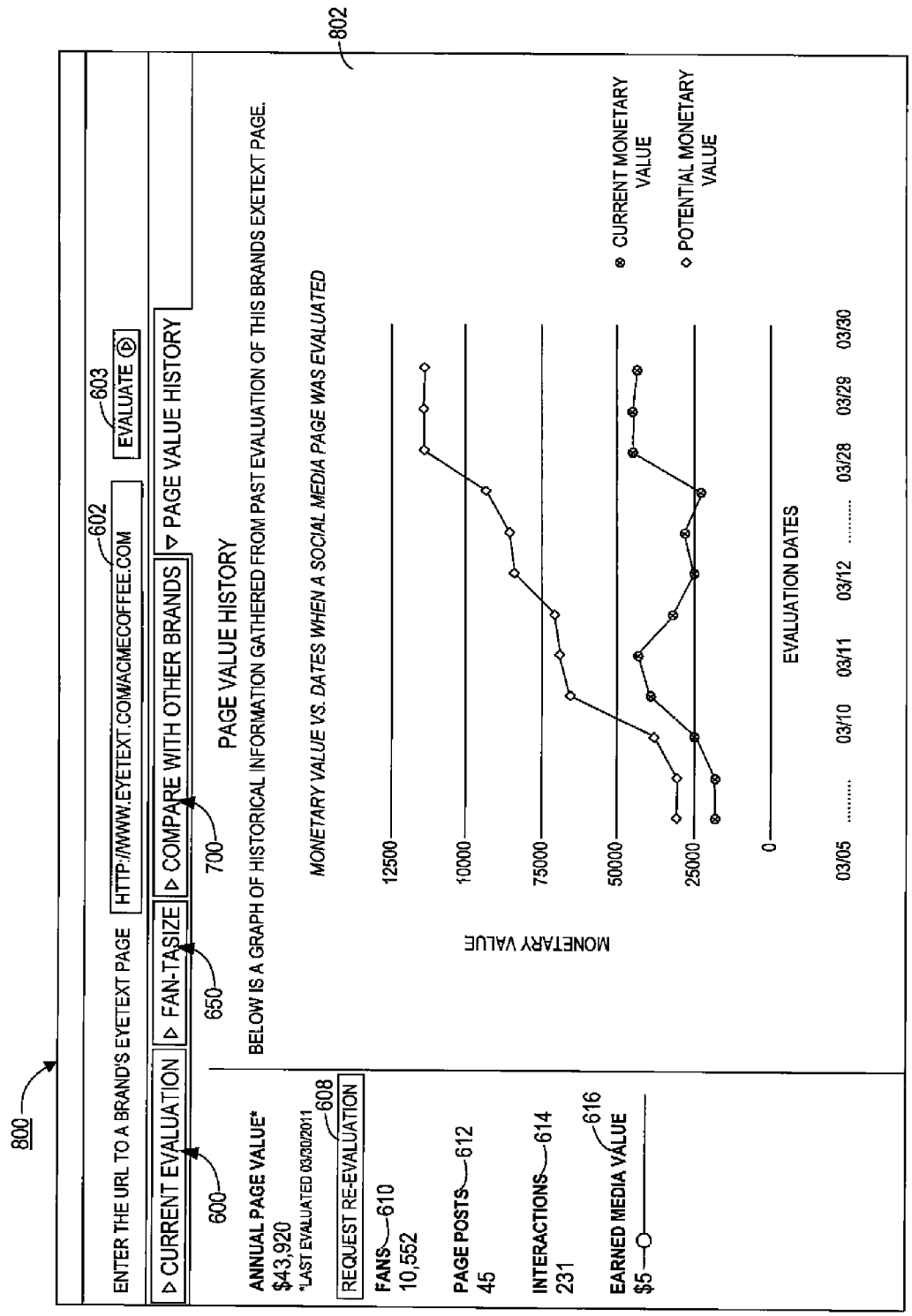
FIG. 8 - Exemplary SMPE Interface Displaying Analytics of Evaluation of Social Media Page

SYSTEMS AND METHODS FOR DETERMINING VALUE OF SOCIAL MEDIA PAGES

CROSS REFERENCE TO RELATED APPLICATION

This application claims benefit under 35 U.S.C. §119(e) and priority to U.S. Provisional Patent Application No. 61/333,647, filed May 11, 2010, and entitled "Social Page Evaluator", which is incorporated herein by reference as if set forth herein in its entirety.

TECHNICAL FIELD

The present disclosure relates generally to evaluating content on social media pages, and more particularly to systems and methods involved in developing an objective basis of evaluating the effectiveness of published content on social media pages, for purposes of enriching content in social media pages, thereby creating increased engagements and interaction among users of social media pages.

BACKGROUND

Establishing a well-rounded social media presence is important for many organizations, corporate entities and private individuals. Social media pages belonging to private individuals generally provide an online description of a page owner's socio-cultural profile including a page owner's friends, family, hometown, birthday, relationship status, political views, fans, interests, hobbies, likes, dislikes, and many more such attributes. Social media pages further provide a page owner's socio-economic status, educational background, professional qualifications and expertise, various networks, ventures and organizations a page owner is affiliated with, career opportunities a page owner is involved in, and several others. Social media pages belonging to organizations and corporate entities provide information relating to their businesses, business ethics, human rights, diversity in their workplace, sustainability considerations undertaken, charities supported, donations, endorsements, upcoming events, and various other parameters that impact society. In recent times, social media pages belonging to individuals, political parties, and non-profit institutions disseminate mass information about social and political uprisings and wrongdoings in restrictive and undemocratic territories and countries.

Social media pages of private individuals, organizations and corporate entities are typically hosted by social media systems, also referred to as social media networks. Common examples of social media systems include YOUTUBE™, FACEBOOK™, TWITTER™, LINKEDIN™, MYSPACE™, GOOGLE BUZZ™, and many more. Further, examples of social media systems include social bookmarking sites like Del.icio.us™, and social news sites like DIGG™ and REDDIT™. Social media pages generally comprise web pages hosted by a social media system and can be accessed via computers, smart phones or any other Internet-enabled computing device.

Users of social media systems typically own one or more social media pages that are used as a platform to interact, exchange and engage with other owners or users and even, in some cases with individuals who do not own social media pages. Social media pages are personal or group pages that disseminate information through messages, files, posts, news feeds, photographs, audio clips, video clips, URL's, etc. Information shared on social media pages often involves associations through personal and business contacts, for example, friends, family, classmates, co-workers, customers, political constituents, clients, and various social groups/organizations on a social media system. In many scenarios, social media pages create associations by facilitating the acquisition of new contacts and networks.

As a result of such associations involving personal and business relationships, it is well known in the art that many individuals, organizations, groups, corporate entities and communities are empowered with potential marketing tools, relating to their products or services. Consequently, a large number of marketing campaigns are launched via social media pages, different from conventional marketing campaigns involving radio, television, print, and traditional online ads that are not dependent on social media systems.

In advertising and marketing campaigns launched via social media pages, advertisers and marketers post messages or advertisements on social media pages belonging to an individual, an organization, corporate entity, or in some scenarios, on a social media page that is owned by a common interest group or channel. Often, the social media page is owned by the marketer itself. Individuals review such messages or advertisements, generally termed "posts", along with accompanying files, news feeds, photographs, audio clips, video clips, coupons, polls, quizzes, URLs (Uniform Resource Locators) etc. It will be understood by one of ordinary skill in the art that use of such a wide variety of multimedia tools and features promotes rich, interactive and personalized social media experiences and manifests by driving users and web traffic to a social media page belonging to a social media page owner.

Notwithstanding the aforementioned benefits, it will also be understood that such a diverse set of multimedia tools and features (involving various files, posts, news feeds, photographs, audio clips, video clips, coupons, polls, quizzes, etc.) to publish content in social media pages, in combination with a wide array of social media systems (for example, FACEBOOK™, TWITTER™, LINKEDIN™, to name a few), creates an overwhelming multitude of options for social media page owners. To complicate matters, social media systems have disparate demographic and psychographic characteristics, and differ on rules, policies and standards on accessing published content. Consequently, when publishing new content on top of content that has already been published, performance evaluation (e.g., how well certain content resonates with viewers, users, or members of a given social media page) of published content on a social media page is crucial in understanding impact of such content. Such an evaluation saves time and valuable resources to individuals and/or organizations enabling them to publish quality content on social media pages, targeted at achieving an impact on users who review such pages. An ideal evaluation should not consume too much time, and should be able to be performed easily by individuals with minimal technical skills, and further can be repeated more than once, as necessary. Clearly, outcomes or results of an evaluation should comprise meaningful qualitative as well as quantitative performance measures that will depend on engagements and interactions of users with respect to a social media page. Since engagements and interactions are key to analyze the impact of social media pages, these measures can be used to determine various statistics that will determine the effectiveness of published content on social media pages. Examples of such engagements and interactions might include fan comments or "likes," total number of fans of a given page, "re-tweets," user-forwarded invitations to join a particular page, and other such measures.

Furthermore, an evaluation mechanism should contain provisions for making changes to assumptions considered in an evaluation, based on preferences of an individual who wishes to evaluate the effectiveness of published content on a social media page. Additionally, the evaluation mechanism should also provide recommendations on best practices of publishing content on social media pages with the intention that this will generate increased interactions and engagements by users. Accordingly, based on the knowledge of various performance measures and recommendations of an evaluation, users and/or owners of social media pages can employ one or more strategies and actions as appropriate, with a goal of maximizing the impact of a social media page.

BRIEF SUMMARY

Briefly described, and according to one embodiment, aspects of the present disclosure generally relate to systems and methods related to evaluating social media pages of individuals, organizations and corporate entities, for purposes of enriching content published on social media pages that will promote greater interaction among users and drive web traffic to such pages. Social media pages are generally web pages that are hosted by social media systems. Users or owners of social media pages disseminate information through messages, files, posts, news feeds, photographs, audio clips, video clips, URL's, etc. with friends, family, classmates, co-workers, customers, political constituents, clients, and various social groups/organizations on a social media system.

According to one aspect of the present disclosure, and described in greater detail herein, a social media page evaluator (SMPE) enables users of social media pages to evaluate a social media page, either owned by them or by other users or organizations. Users access an embodiment of the SMPE generally using a computer, smart phone or any Internet enabled computing device. According to one embodiment, aspects of the SMPE are hosted on a computer server at a physical location or in a cloud-computing environment.

According to one aspect of the present disclosure, an evaluation process performed by the SMPE comprises computation of meaningful qualitative as well as quantitative performance measures that will depend on engagements and interactions of users on a social media page. According to another aspect, an evaluation process includes the ability to extract several analytics associated with different social media pages. Such analytics comprise various page-specific criteria and parameters that characterize engagements and interactions of users on a social media page (also referred to herein as "engagement information"). Examples of such engagement criteria and parameters include number of posts by users in a social media page, number of comments made by users (to posts by other users) in a social media page, usage of multimedia tools (audio clips, video clips, polls etc.) in posts, and the like. Also, aspects of the present disclosure involve computing various statistics extracted from social media pages to arrive at a measure or value (e.g., a monetary value) that characterizes a brand's worth on a given social media page.

Further, aspects of the present disclosure relate to classifying statistics of engagement criteria and parameters (for example, number of daily posts per day) into one of a pre-determined classes (for example, high/medium/low) that indicate different degrees of user involvements and activities.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 1 illustrates an overview of an embodiment of a Social Media Page Evaluator (SMPE) for evaluating the effectiveness of published content on a social media page, operating in an exemplary environment.

FIG. 2 shows an exemplary SMPE architecture comprising various software modules, engines and other similar elements, according to one embodiment of the present system.

FIG. 3 is an exemplary sequence diagram illustrating computer-implemented method steps involved in interactions involving an embodiment of the SMPE and various other associated components operating in an exemplary environment.

FIG. 4 is a flowchart showing computer-implemented method steps included in an exemplary SMPE process involving various software modules and engines of the SMPE, according to one embodiment of the present system.

FIG. 5 shows an exemplary SMPE datatable storing several variables related to various social media attributes associated with a social media page, used in connection with one embodiment of the present system.

FIG. 6 consisting of FIG. 6A and FIG. 6B includes screenshots of exemplary SMPE interfaces showing results of evaluations of published content on a social media page, according to one embodiment of the present system.

FIG. 7 is a screenshot of an exemplary SMPE interface used in comparing evaluations of published content on multiple social media pages, according to one embodiment of the present system.

FIG. 8 is a screenshot of an exemplary SMPE interface displaying various analytics extracted from evaluation of published content on social media pages, according to one embodiment of the present system.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Aspects of the present disclosure generally relate to systems and methods for evaluating the content associated with social media pages to measure or identify the effectiveness of that content in terms of user interaction or interest with the social media pages. Additional aspects relate to accessing embodiments of the present system easily via an interactive, user-friendly graphical user interface (GUI) via the World Wide Web (WWW). Additionally, aspects of the present disclosure include the ability to extract several analytics associated with different social media pages. Such analytics comprise various page-specific criteria and parameters that characterize engagements and interactions between individuals (or, system users) who review a social media page, and the social media page itself. Examples of such engagement criteria and parameters (or "engagement information") include number of posts by users in a social media page, number of comments made by users (to posts by other users) in a social media page, usage of multimedia tools (audio clips, video clips, polls etc.) by a social media page owner in posts, and the like.

Further, aspects of the present system relate to reporting of such engagement criteria and parameters extracted from social media pages. Even further, aspects of the present disclosure relate to classifying such engagement criteria and parameters (for example, such as number of daily posts per day) into one of a pre-determined class (for example, high/medium/low) that indicates different degrees of user involvements and activities. Also, aspects of the present disclosure involve using various analytics extracted from social media pages to arrive at a measure (such as a monetary value, point system, ranking scale, etc.) that characterizes a brand's worth across several social media pages, or in connection with a singular social media page (e.g., a page owned by hypothetical marketer Acme Coffee).

Referring now to the figures, FIG. 1 illustrates an overview 100 of an embodiment of a social media page evaluator (SMPE) 110 in an exemplary environment, constructed and operated in accordance with various aspects of the present disclosure. According to one embodiment, system users, or simply, users 102 access a social media system 106 to publish new material, edit or review published material on social media pages 104, hosted by social media systems (SMS) 106. Users 102 or, owners of social media pages, create a personal or group profile page (typically a web page) and use it as a platform to share information through messages, files, posts, news feeds, photographs, audio clips, video clips, URL's, etc. As will be understood by one skilled in the art, users 102 can access their own social page, and can also access and interact with social media pages owned or related to other users, groups, organizations, and corporate entities.

As shown in FIG. 1, users 102 include individual users, and in some scenarios, one or more users are a part of an organization or corporate entity 109. Further, those skilled in the art will also understand that social media pages also present marketers and advertisers affiliated with organizations, groups, and entities with potential marketing tools to advertise their products and/or services. In other words, marketers and advertisers can create social media pages specific to their brands, and post messages or advertisements on these social media systems as a way to advertise outside of conventional marketing channels such as radio, television, and print. Such messages or advertisements can include polls, quizzes, video clips, coupons, and various other multimedia tools and features. Thus, as will be understood and appreciated, users 102 may include companies or "marketers" that wish utilize social media systems to push content to their consumers via their respective social media pages.

Generally speaking, and as will be understood by a person skilled in the art, a social media page is a webpage hosted by a social media system on the world wide web. As shown in FIG. 1, computers (e.g. laptops, desktops, severs, tablet computers, etc) or computing devices (e.g. smart phones) capable of accessing the world wide can be used to communicate with social media systems for purposes of publishing new material, editing or reviewing published material on social media pages 104.

According to one embodiment of the present disclosure, a SMPE 110 is used to evaluate the effectiveness of published content on a social media page in terms of user interaction or engagement with the given social media page. For example, a marketer may wish to determine the effectiveness of its social media page in interacting with the marketer's current or prospective consumers. This effectiveness is hard to determine, given that many factors relate to such effectiveness, such as the interest level of its fans or users in the page content, how often the fans or users interact with such content (or other users), etc. Those skilled in the art will understand and appreciate that such an evaluation will depend on the type of engagement and interactions between users and a social media page. For example, if a social media page has a past history of posting messages with multimedia tools (e.g., audio clips, video clips, pictures, polls, etc.) every day, then that page may be more likely to have high engagement by users visiting that page. Alternatively, if a page's content remains static for many days or weeks, the number of visits to the page or user interaction may be low. Details of one embodiment of an evaluation process performed by the SMPE 110 will be described in connection with FIG. 4 and other figures herein. According to another embodiment of the present disclosure, results of an evaluation performed by the SMPE 110 along with various analytics extracted from published content on a social media page are provided by the SMPE 110 to users 102 through a display monitor or screen on user's computer or computing device.

A high level summary of actions performed by users 102 and the SMPE 110 is shown in FIG. 1, indicated with the letters "1" for users' actions, and the letters "2" and "3" for actions involving the SMPE 110. Detailed steps involved in the interactions between users 102, social media systems 106 and an embodiment of the SMPE 110 are explained with a sequence diagram in FIG. 3.

Typically, communication between users' computers/computing devices and social media systems 106 proceeds through a network 108, such as a Web-deployed service with client/service architecture, a corporate Local Area Network (LAN) or Wide Area Network (WAN), the Internet, or through a cloud-based system. Further, as will be understood and appreciated, various networking components like routers, switches, hubs etc., are typically involved in communication between users' computers/computing devices and social media systems 106. Although not shown in FIG. 1, it can also be further understood that such communication may include one or more gateways/firewalls that provide information security from unwarranted intrusions and cyber attacks.

According to one embodiment of the present disclosure, an embodiment of the social media page evaluator (SMPE) 110 is hosted on a third party physical server, or a cloud server and is used for purposes of evaluating the effectiveness of published content (material) on social media pages 104 hosted by social media systems (SMS) 106. As shown in FIG. 1, an embodiment of the SMPE includes a SMPE management module 112 and a SMPE database 114. Generally, the SMPE management module 112 includes various software engines and modules that execute various processes. Such processes involve several tasks, for example, retrieval of various criteria and parameters that depends on engagements and interactions between users of social media pages and social media pages themselves, processing the retrieved criteria to generate qualitative and quantitative results in connection with evaluating the effectiveness of published content on social media pages, and further displaying results of such an evaluation.

Those skilled in the art will understand and appreciate that such an evaluation is used to characterize the type of engagement and interactions between users and a social media page. For example, if a social media page has a past history of a moderately high number of posts per day, then usually such a page is subject to high engagement by users visiting that page. Details of the process performed by various software modules and engines included in an embodiment of the SMPE, and involved in evaluation of social media pages, are explained with a flowchart in FIG. 4. Various software modules and engines that comprise an embodiment of the SMPE are discussed in FIG. 2.

As will be explained later in greater detail, engagement criteria and parameters extracted from a social media page are provided by social media systems to the SMPE. Examples of such criteria and parameters include number of users (e.g., "fans" or members) of a given social media page, number of posts by users in a social media page, number of comments made by users (to posts by other users) in a social media page, usage of multimedia tools (audio clips, video clips, polls etc) in posts, and the like. Such criteria and parameters are typically stored in a SMPE database 114 and then used for evaluation of the respective social media page. Results of the SMPE evaluation are also saved in a SMPE database, and displayed to users who wish to view such evaluation, in real time or non-real time. Exemplary data tables storing various criteria and parameters extracted from a social media page are illustrated in FIG. 5. Additionally, exemplary results of evaluation of a social media page are also shown in the data table shown in FIG. 5.

Results of an exemplary evaluation are shown with screenshots in FIGS. 6A, 6B, 7 and 8. Generally speaking, these figures illustrate different performance measures and statistics associated with various engagement criteria and parameters such as number of posts by users, number of comments made by users to posts of other users, number of fans of a page, usage of multimedia tools in posts, etc. According to one embodiment, a performance measure is based on an estimate of a monetary value of a social media page, with an underlying assumption for branding on such pages. This will be of interest to many individuals, organizations and corporate entities who wish to assess their brand's worth on social media pages. Thus, various engagement criteria and parameters extracted from social media pages, can be translated into a measure of effectiveness for a given social media page, such as a point value, or ranking, a monetary value, or other type of indicator. FIGS. 6A, 6B, 7 and 8 illustrate exemplary screenshots showing a monetary value associated with social media pages. Further, FIG. 7 shows a screenshot of an exemplary interface of the SMPE that allows comparison of the effectiveness of multiple social pages. According to one embodiment of the present disclosure, such a comparison is accomplished by using the monetary value of social media pages. As will be understood, the above mentioned screenshots discussed herein are for illustrative purposes only.

The discussion above in association with FIG. 1 merely provides an overview of an embodiment of the present system for evaluation of the effectiveness of published content on a social media page, and is not intended to limit in any way the scope of the present disclosure. Accordingly, various other embodiments of the SMPE that use other functionalities, steps, system components, performance measures (for example, a real valued objective function that reflects user engagement and is maximized over a set of variables and constraints) instead of a monetary valuation, are possible, as will occur to one of ordinary skill in the art. Alternate embodiments can also use various engagement parameters and criteria, some or all of which may be different than those discussed herein.

Turning now to FIG. 2, an exemplary SMPE architecture 200 is shown, involving architectural details of the SMPE management module 112 (comprising various software modules and components), communicating with a SMS management module 210 that is a part of an exemplary social media system (SMS) 106. As shown in the embodiment in FIG. 2, a SMS 106 includes a SMS management module 210 that contains, various standards, rules, and policies in connection with social media pages hosted by a SMS. For example, a SMS 106 generally has specific configurations such as application programming interfaces (APIs) for developers and software programmers to access or publish content on social media pages hosted by the respective SMS, and/or to interact with or retrieve information from respective SMS's. In another example of functionalities of a SMS management module 210, various components such as users, events, pages, video clips, and the connections between them (e.g., friend relationships, shared content, and photo tags), are represented as objects (or, generally data structures) on a graph. Information related to such objects content can be exchanged using specific standards and formats such as Java Script Object Notation (JSON) or Extensible Markup Language (XML). Even further, a SMS 106 has strict guidelines on the privacy of users' pages. For example, a SMS 106 might allow third party developers and software programmers to access only publicly available information on social media pages. To obtain additional information about a social media page, developers must first get the page owner's permission. Such a permission can be granted by a page owner in the form of an "access token", i.e. a software certificate conferring proper rights and privileges. Third party developers can perform authorized requests on behalf of a user by specifying the access token of an user in an API request. Those skilled in the art will understand and appreciate that various other functionalities related to accessing social media pages (hosted by a respective SMS 106) are handled by a SMS management module 210.

As shown in FIG. 2, an embodiment of the SMPE communicates (e.g., via the SMPE management module 112) with a respective SMS (e.g., via a SMS management module 210) over a network 108 to retrieve information related to social media pages. According to an embodiment of the present disclosure, the SMPE management module further comprises several software modules, for example, a data retrieval module 212, a data processing module 214, and a data display module 216. Information related to social media pages is colleted by data retrieval module 212 from the SMS management module 210 and is typically stored in an exemplary SMPE database 114. Examples of engagement information include but are not limited to various engagement parameters and criteria such as number of posts, number of followers of a user, number of comments, number of references to a user's name in posts published by other users, and number of posts of a user that were further re-posted by other users. Other examples include usage of multimedia tools (e.g., polls, quizzes, video clips, etc.). An exemplary datatable storing representative data retrieved from social media pages is shown in FIG. 5. According to an embodiment of the present disclosure, final results of an evaluation are stored in SMPE database 114, in addition to data pertaining to intermediate stages (i.e. before obtaining final evaluation results) of processing social media pages.

Information related to social media pages and collected by data retrieval module 212 is then processed to evaluate the estimated value of a social media page. According to one aspect of the present disclosure, processing such information involves arriving at various user-specific and page-specific statistics. According to another aspect of the present disclosure, information is processed in a data processing module 214. These statistics generally comprise various qualitative and quantitative measures that characterize the type of engagement and interactions that are obtained as an outcome of performing such an evaluation. Eventually, the results of an evaluation (also referred to herein as an evaluation measure) are displayed to users 102 by a data display module 216 that usually is a part of a SMPE management module 112. Further, results of an evaluation can be provided in reports in electronic and print form that can also be customized to suit the requirements of an individual or an organization who wishes to review such reports. As will be understood and appreciated, software modules and databases discussed in the present disclosure are for exemplary purposes only. Various other software modules and databases can be used in alternate embodiments of the present disclosure.

Now referring to FIG. 3, a sequence diagram is shown that illustrates a series of interactions as a system user evaluates a social media page hosted by a SMS, using an embodiment of the SMPE. As will be understood, the key components involved in an exemplary evaluation process include a system user 102, an embodiment of the SMPE 110, and one or more SMSs 106. Further, as will be understood, a system user 102 accesses the SMPE 110 online via a computer, smart phone or any other Internet-enabled computing device. Furthermore, it will also be understood that users 102 wish to evaluate the effectiveness of content published on social media pages that are personally owned by them, or owned by other users, and hosted in a SMS 106. For illustrative purposes, one SMS is considered in the discussion of FIG. 2. However, it will be understood that no such limitation is imposed, and alternate embodiments can use multiple SMSs, or even multiple instances of the same SMS 106. According to one aspect of the present disclosure, various functionalities of a SMS 106 discussed in FIG. 2 in connection with accessing social media pages are handled by a SMS management module 210.

As shown in FIG. 3, at step 1, a system user 102 submits an URL or other identifying information of a social media page that is desired to be evaluated, to an embodiment of the SMPE 110. In case the URL submitted by a user 102 is invalid, or the submitted URL is old or restricted by geographical region or countries, an error message is displayed on the user's screen. Those skilled in the art will understand and appreciate that in the above mentioned scenarios, the SMPE 110 communicates with the SMS 106 in real time to verify that the user-submitted URL is a valid URL. According to another embodiment, a list of such restricted URL's is pre-stored in a database coupled with the SMPE 110. The SMPE 110 can periodically/intermittently query a SMS 106 to enquire about restricted sites, and based on the response received from a SMS 106 to such queries, a SMPE 110 can update a list of restricted sites. Hence, it will be understood that if the user submitted URL in step 1 is found to be invalid by the SMPE 110, an error message will be displayed on the screen of a user's computing device. In one embodiment, the SMPE 110 provides an user with an auto-complete feature that provides suggestions for relevant URLs, when an user types in an URL partially.

As will be understood and appreciated, in some embodiments of the present system, a user does not necessarily input or rely upon a URL to request evaluation of a given social media page, but instead submits other page-identifying information. For example, one embodiment of the present system may utilize a search functionality in which the user can input key terms associated with a given page (such as the name of a specific brand or marketer), and then the embodiment of the system retrieves potential matches for social media pages that may satisfy the user's search requests. In another embodiment, the name of a person associated with a social media page or account may be used to identify the page or account to be evaluated. Other embodiments that utilize other social media page or account identifying information can be used as will occur to one of ordinary skill in the art. Thus, reference herein to use of a URL to identify the social media page to be evaluated is presented for illustrative purposes only.

Still referring to FIG. 3, if the user submitted URL is a valid URL, the SMPE 110 submits a query (at step 2) to a SMS 106 requesting information relating to the social media page associated with the user-submitted URL. A query is usually in the form of a Web-services call, however other alternative methodologies can also be employed. As recited previously, a SMS 106 might allow third party software systems, such as the SMPE 110 to access only publicly available information on social media pages. Generally, publicly available information is requested from a SMS 106 and submitted as a query (shown in step 2). According to one embodiment, a query involves the SMPE 110 requesting information from a respective SMS 106 related to various criteria and parameters that represent engagements and interactions between users on social media pages. Examples of such criteria and parameters include number of posts, number of followers of an user, number of comments, usage of multimedia tools in posts, evidence of questionable fan activity including presence of bad words or links in a social media page, and the like. Further it will be understood that a query can request such criteria and parameters related to a social media page retroactively, for example, as noted in the last thirty days, or between some specified dates in the past.

In one embodiment, the SMPE 110 is able to access non-public information (outside of publicly available information) on behalf of a user by specifying an "access token" of an user in an API request to a SMS 106 by specifying in the form of an "access token" that is a software certificate conferring proper rights and privileges, and is typically granted by an owner of a social media page. On receiving such an access token (or, its equivalent) the SMPE 110 can perform authorized requests on behalf of a user by specifying the access token of an user in an API request to a SMS 106.

Referring to the interactions shown in FIG. 3, at step 3, the SMS 106 receives a query transmitted by the SMPE in step 2, processes the query by extracting or retrieving information relating to a social media page as indicated in the query in order to create a response. Often, the requested information is maintained in an SMS database (not shown). Then, at step 4, the response is sent by the SMS 106 to the SMPE 110. Typically, the response is sent via a formatted file, such as a Java Script Object Notation (JSON) or Extensible Markup Language (XML) document.

The SMPE 110 then receives the response and extracts information from the received response by parsing the received response document. The extracted information is then utilized in an evaluation methodology (step 5) to perform the task of evaluating the effectiveness of published content on a social media page corresponding to the URL submitted by a user in step 1. According to one embodiment of the present disclosure, an evaluation methodology (described in detail in FIG. 4) involves usage of a mathematical model that is a function of various numerical parameters such as number of posts by a page owner, number of followers of a page, number of fans of a page owner, number of comments made by users, number of posts that were preferred ("liked") by users and various other engagement information related to a social media page.

According to another embodiment of the present disclosure, an evaluation mechanism depends on an Earned Media Value, which generally represents the value in terms of advertising dollars of a social media post or interaction, based on user engagement. This Earned Media Value is akin to a CPM (cost-per-thousand-views) or cost-per-click value that is typically used in online marketing and advertising to measure the cost of an electronic marketing campaign, and its consequent impact on consumers. For example, a CPM of $5 indicates that for one thousand (1000) consumers to review an electronic advertisement, $5 has to be spent on the electronic advertisement. Thus, earned media value is a quantitative measure of the value of a given social media post or message. In one embodiment, an evaluation methodology utilizes an Earned Media value in conjunction with numerical engagement parameters (extracted from a social media page, as explained earlier) to arrive at a monetary valuation of a social media page. Exemplary engagement parameters stored in a datatable associated with an embodiment of the SMPE 110 are shown in FIG. 5.

Still referring to FIG. 3, according to an aspect of the present disclosure, a pre-determined (default) Earned Media value is assumed by the SMPE 110, and then used in the evaluation process. According to another aspect, a user who wishes to evaluate the effectiveness of published content on a social media page, inputs an Earned Media value to be used in the evaluation process. As shown in FIG. 3, at step 6, results of evaluation of a social media page (corresponding to the URL submitted by the user previously in step 1), are displayed through a graphical interface to a user. Details of an exemplary evaluation process will be next described with a flowchart in FIG. 4. FIGS. 6, 7 and 8 display exemplary screenshots showing an Earned Media value, as used in an exemplary evaluation process for a social media page owned by a hypothetical company "Acme Coffee", wherein the social media page is hosted by a fictitious social media system called "Eyetext".

Referring now to FIG. 4, an exemplary social media page evaluation process 400 is illustrated, as performed by an embodiment of the SMPE 110 to evaluate the effectiveness of published content on a social media page. As will be understood and appreciated, the steps of the process 400 shown in FIG. 4 are not necessarily completed in the order shown, and various steps of the SMPE may operate concurrently and continuously. Accordingly, the steps shown in FIG. 4 are generally asynchronous and independent, computer-implemented, tied to particular machines (including various modules/engines of the SMPE management module 112, coupled to databases, users' devices to access the SMPE server(s) and/or one or more social media systems), and not necessarily performed in the order shown.

Starting at step 404, the SMPE receives an URL from a system user of a social media page to be evaluated. As will be understood, social media pages owned by users are hosted by a social media system (SMS) 106. Users access an SMS 106 for purposes of publishing new material, editing or reviewing published material on social media pages. Those skilled in the art will understand that users 102 often wish to evaluate the effectiveness of content published on social media pages that are owned by them, or owned by other users 102. Although not shown in FIG. 4, it will be understood that in the event the URL submitted by a user 102 is invalid, or the submitted URL is restricted based on age or by geographical region or countries, an error message is displayed on the user's screen. Those skilled in the art will understand and appreciate that in the above mentioned scenarios, the SMPE 110 communicates with the SMS 106 in real time to verify that the user submitted URL is a valid URL. According to another embodiment, a list of such restricted URL's is pre-stored in a database coupled with the SMPE 110. Such a list can be updated by the SMPE 110 on the basis of responses (obtained from a SMS 106) to queries on restricted sites, transmitted periodically/intermittently, by the SMPE 110 to a SMS 106. Hence, it will be understood, if the user submitted URL in step 404 is found to be invalid by the SMPE 110, an error message will be displayed on the screen of an user's computing device. Consequently, the evaluation process is terminated, and the process ends.

If the user submitted URL in step 404 is a valid URL, the SMPE 110 determines (at step 408) whether the social media page corresponding to the respective URL has been evaluated previously. If the SMPE 110 determines that the respective social media page has been evaluated before, then according to one embodiment, pre-stored results of the evaluation are retrieved (at step 412) from a database (for example, a SMPE database 114). Subsequently, the process jumps to step 436 to display results of the evaluation. (Screenshots of a graphical user interface (GUI) displaying results of an exemplary evaluation process are indicated in FIGS. 6, 7, and 8). According to another embodiment, the SMPE displays appropriate messages and prompts for a user to enter additional information, for example, the SMPE displays a message requesting the user to enter specific analytics related to the evaluation process that an user desires to review.

In another embodiment, rather than simply displaying the previously-stored results from a previous evaluation, the SMPE updates the results to reflect updated content associated with the social media page (as obtained via steps 416-432, described below). For example, regardless of whether an evaluation has been performed previously, the SMPE may determine a new evaluation for the given page (again, based on new or updated content), and display that new evaluation to a system user. Then, the new evaluation can be compared to previous evaluations for purposes of analyzing the change in valuation of the given page over time.

Referring again to FIG. 4, if at step 408 the SMPE determines that a social media page corresponding to the user submitted URL has not been evaluated previously, then the SMPE initiates (at step 416) a network session with the respective SMS that is linked to the URL. On receiving a request to initiate a session, a SMS responds back to the SMPE, and thus a network session is established.

Once a network session is established, at step 420, the SMPE requests (in the form of a query) formation from the SMS relating to the social media page associated with the user-submitted URL. A query is typically a Web-services call, however other alternative methodologies can also be employed. As recited previously, a SMS might allow third party software systems, such as the SMPE 110 to access only publicly available information on social media pages. Generally, publicly available information that is requested from a SMS 106 submitted in a query includes various criteria and parameters (referred to herein as engagement information) that represent engagements and interactions between users of social media pages, as characterized on a social media pages. Examples of such criteria and parameters include number of posts, number of followers of a user, number of comments, usage of multimedia tools in posts, evidence of questionable fan activity including presence of bad words or links in a social media page, and the like. Further, a query can request such criteria and parameters related to a social media page retro actively, for example, as noted in the last thirty days, or between some specified dates in the past. To obtain additional information (outside of publicly available information) on a social media page, third party software systems would need to first get the social media page owner's permission. Such a permission can be granted by an owner in the form of an "access token" that is a software certificate conferring proper rights and privileges. Third party software systems such as the SMPE can perform authorized requests on behalf of a user by specifying the access token of an user in an API request to a SMS.

In turn, the SMS receives the query transmitted by the SMPE, processes the query by extracting information from a social media page as indicated in the query, in order to create a response. Next, at step 424, the response sent by the SMS is received by the SMPE. The SMPE 110 receives the response and extracts information from the received response by parsing the received response document. According to one embodiment of the present disclosure, steps 420 and 424 in FIG. 4 are performed by a data retrieval module 212. However, embodiments of the present system are not limited to such modules. Alternative embodiments can employ various other software modules/engines for performing such steps.

At step 428, the SMPE (specifically, a data processing module 214, or its equivalent) processes the received social media page information according to a social media page evaluation algorithm. As recited previously, such an algorithm (or methodology) evaluates the effectiveness of published content on a social media page corresponding to the URL submitted by a user in step 404. Those skilled in the art will understand and appreciate that owners of social media pages create a social media page and use it as a platform to share information through messages, files, posts, news feeds, photographs, audio clips, video clips, polls, coupons, quizzes, etc. Such types of content generate interests and engagement among users who review that page, and accordingly, increased use of rich meaningful, and relevant content makes a social page popular among users, generating higher traffic to such social media pages. As a result of such user activity and involvement, various engagement criteria and parameters are extracted from a social media page. Examples of such criteria and parameters include (but not limited to) various numerical parameters such as number of posts by a page owner, number of followers of a page, number of fans of a page owner, number of comments made by users, number of posts that were preferred ("liked") by users and various other numerical engagement parameters, usage of multimedia tools in posts, evidence of questionable fan activity including presence of bad words or links in a social media page, and various other user engagement related attributes in a social media page.

Those skilled in the art will understand and appreciate that an outcome of an evaluation process involves various qualitative and quantitative performance measures (also referred to herein as evaluation measures) that depend on engagement information extracted from a social media page. According to one embodiment of the present disclosure, a performance measure is based on a monetary value of social media page.

Various numerical parameters that characterize user activity are passed as inputs to an exemplary mathematical model (recited herein for illustrative purposes) as follows:

$$\text{Monetary Value} = \text{Fans} * \text{Earned Media value} * \text{Eng. multiplier; wherein,}$$

$$\text{Eng. multiplier} = \text{Eng. Index} * [(\text{Likes} + 4 * \text{Comments})/\text{Posts} + \text{FanPosts}]/\text{Fans}.$$

In the above, Likes represents a number of users who have expressed that they appreciate content (for example, by clicking on a button) on a social media page. Posts indicates a number of posts including links, pictures, messages, coupons, videos, polls, or any type of content posted by users on a social media page. Comments indicates a number of comments posted by users. Fans represent a number of users who are fans of a social media page. In other words, fans comprise users who are admirers or followers of a social media page. As will be understood, interactions from fans are considered more valuable (i.e. greater engagement) than users who are non-fans. Fanposts indicates a number of posts published by fans of a social media page. The constant value "4" shown in the above formula is an arbitrarily set value based on historical data relating to values associated with social media pages, and lends itself to a monetary calculation that corresponds to such historical data. As will be understood, the numbers, constants, and variables used in the above formulation are presented for illustrative purposes only, and are subject to change.

As indicated in the above formula, Eng. multiplier identifies an engagement multiplier that is a quantitative measure representing mean engagement of users in a social media page. In other words, Eng. multiplier is some mean value of "how engaged" users (including fans) are with a social media page. According to one embodiment of the present disclosure, Eng. multiplier depends on variables such as "Likes", "Comments", "Posts", etc. which are innumerable quantities counted from users' interactions on a social media page, and can be obtained from social media systems that host the social media page. It will be recalled that various qualitative criteria along with numerical engagement parameters is requested from a SMS by an embodiment of the SMPE in step 420 of the process 400.

According to one embodiment of the present disclosure, the Eng. multiplier is a floating point number that is used by the SMPE to estimate a current and also a potential monetary value of a social page. A current monetary value of a page is calculated based on numerical engagement parameters, requested from a SMS by an embodiment of the SMPE. Such parameters are then further used to estimate (or, in other words, predict theoretically) a potential monetary value of a social media page, if quality of published content is improved. An exemplary method according to which the SMPE makes a prediction for a potential monetary value of a social media page is further explained below.

Those skilled in the art will appreciate that generally changing an Eng. multiplier captures theoretically the effect of change in mean engagement of users in a social page. Such changes can be effected by changing the quality of published content (for example, multimedia in posts, reasonably high number of meaningful posts per day, etc.) on a social media page. In other words, higher values of Eng.

multiplier are indicative of better quality content on a social media page and vice versa. According to one embodiment of the present disclosure, Eng. multiplier is constrained to lie in a predetermined interval, for example, in the interval between one (1) and three (3), wherein, three (3) is assigned to an Eng. multiplier to predict a potential monetary value of a social page, if a page comprises better quality content. But, one (1) is assigned to an Eng. multiplier to compute a current monetary value of a page (based on the above formula or some other mathematical formula). Alternatively, it will be understood that if the value taken by Eng. multiplier is less than one (1), or greater than three (3), then Eng. multiplier is assigned (by the SMPE) a value one (1) or three (3) respectively, thus constraining Eng. multiplier to lie in the interval between one (1) and three (3). It will be understood that the interval between one (1) and three (3) is used herein, based on empirical assumptions. Various other predetermined intervals, relevant in a social media context, can be used as will occur to those with skill in the art. Furthermore, Eng. Index is a constant that constrains the Eng. multiplier parameter to lie in such an interval.

According to an embodiment and as demonstrated in the above formula, the present SMPE utilizes a numerical quantity called Earned Media value or a Cost per click value. An Earned Media value is a numerical measure that represents a cost of an electronic marketing campaign, and its consequent impact on consumers. As described in greater detail previously, those skilled in the art will understand that Earned Media value is a commonly used metric in online marketing and advertising. According to an embodiment of the present disclosure, an Earned Media value can be manipulated to take a user-defined value entered by an user who wishes to evaluate the effectiveness of published content on a social media page.

As recited previously, various qualitative criteria along with numerical engagement parameters as expressed in the above formula, and also various others as will occur to those skilled in the art, can be obtained from a social media page retro actively, for example, as noted in the last thirty days, or between some specified dates in the past. In addition to being used in computation of a monetary value as shown above, such parameters can also be used to compute various statistics such as "Post Frequency". Generally speaking, Post Frequency is a numerical quantity that indicates number of posts per day, averaged over a time range in the past.

In addition to innumerable quantities, as discussed above, various qualitative criteria associated with social media pages are also used in an evaluation process. Examples of qualitative criteria include (but not limited to): usage of multimedia tools in posts; evidence of questionable fan activity including presence of bad words or links in a social media page; and the like. An evaluation process also includes transforming various qualitative criteria into quantitative statistics. For example, usage of multimedia in posts (an exemplary qualitative criteria), is merged into proportion of posts in a thirty day period that used multimedia tools (a quantitative statistic).

Still referring to FIG. 4, an example of another qualitative criteria used in an evaluation process includes usage of "link shorteners" in posts on social media pages. It will be understood by a person of ordinary skilled in the art that link shorteners provide a mechanism to shorten links (URLs) with alias links that are short, but are still directed to the same page as the original link. Link shorteners are beneficial for purposes of shortening links to a webpage that has a long URL, and is commonly used by users who publish posts containing long URLs on social media pages. Examples of third party link shorteners include bit.ly, ali.gs, idek.net, and various others. It will be understood that URLs accompanying users' posts on social media pages point to websites that may be outside of a social media system, or otherwise.

Nevertheless, it will be understood that several third party link shorteners (for example, bit.ly) that are used to shorten URLs of websites, may often disclose privileged and confidential site-specific data about the websites. Examples of site-specific data may include detailed analytics of web traffic, etc. As a result, a dishonest user can make use of such analytics wrongfully and benefit by unfair means. For this reason, in some circumstances, link shorteners (or modifiers) should be avoided in a social media page context. Hence, according to an aspect of the present disclosure, the SMPE determines occurrences of posts employing third party link shorteners that disclose classified web analytics information. Statistics of such occurrences will be later provided to users who wish to evaluate a social media page that contains posts containing links that are shortened by risky link shorteners. Thus, users of the present system can modify their social media pages to avoid such shorteners once identified.

According to one embodiment, various statistics as described above are further classified into predetermined levels (for example, High, Medium, Low etc.), and outcomes of such classification comprise results of an evaluation (also referred to herein as evaluation measures). For example, if greater than 95% of posts in the past thirty days for a given social media page contained multimedia attachments, then a "High" frequency of multimedia usage is indicated. Clearly, it will be understood that rich, meaningful content in posts is critical to promote interaction among users of a social page Alternatively, if multimedia attachments are present between 85% and 95% of the posts, then a "Medium" frequency of multimedia usage may be indicated. Even further, if 85% or lesser proportion of posts contain multimedia attachments, then a "Low" frequency of multimedia usage is indicated, and so on.

As will be recalled, a post frequency statistic related to a social media page is computed by the SMPE, and defined as a number of posts per day, averaged over a period of time. It will be understood by a person of ordinary skill in the art that post frequency (a numerical quantity) is related to user engagement (a qualitative attribute). It will be further understood that if social media page users post too frequently, then fans and other users who subscribe to a social media page will be overwhelmed with a large number of posts, and consequently, they will start ignoring content, which, in turn, will lower levels of user engagement. On the other hand, if a social media pages do not contain enough posts, other users and fans will not be engaged enough, which will also lower user engagement levels. Thus, it will be appreciated that posting too much or too little can result in reduced engagements of users in a social media page. In other words, a high post frequency does not necessarily correspond to a high levels of user engagement.

Furthermore, those skilled in the art will understand and appreciate that quantitative statistics such as Post Frequency can be classified into various predetermined levels that signify user engagement. For example, if Post Frequency is between 1.5 and 2.5, then a "High" user engagement will be indicated in an outcome of an evaluation process. Or, if the post frequency is between 0.5 and 1.5, then a "Medium" user engagement will be indicated in an outcome of an evaluation process. Additionally, if Post Frequency is greater than 2.5, or in another instance, Post Frequency is less than 0.5, low levels of user engagement is indicated by the SMPE in an outcome of an evaluation process.

In another embodiment of the SMPE, usage of third party URL shorteners or modifiers impacts an evaluation of a social media page. For example, if risky third party URL shorteners are included in posts on a social media page, then a "High" risk level is indicated in the results of an evaluation (also referred to herein as evaluation measures). As will be recalled, this is because URLs shortened by such URL shorteners are prone to be hacked or exposed to a user's competitors. On the contrary, for example, if a social media page employs a custom brand shortener that is brand-specific, and not affiliated with a third party, then a "low" risk level is indicated.

Referring to step 436 in FIG. 4, after a social media page is evaluated, results of an evaluation (also referred to herein as evaluation measures) are displayed to a system user. According to an exemplary embodiment, a data display module 216 performs the steps of display of results of an evaluation to a system user. Screenshots shown in FIGS. 6A, 6B, 7, and 8 illustrate exemplary results of an evaluation. Those skilled in the art will understand and appreciate that results can be customized according to a system user's preferences and further can be exported to a folder in a user's local computer. As will be understood and appreciated, embodiments of the SMPE may utilize various other numerical and non-numerical parameters and criteria extracted from social media pages hosted by a variety of social media systems, and those discussed herein are for illustrative purposes only.

The discussion above in association with FIG. 4 merely provides an overview of an embodiment of the present system describing the evaluation of the effectiveness of published content on a social media page, and is not intended to limit in any way the scope of the present disclosure. Accordingly, various modifications to represent further embodiments of the present disclosure are possible (for example, a function that computes a relative score of user engagement with respect to a theoretical maximum engagement limit as opposed to a monetary valuation of a social media page), as will be understood by one of ordinary skill. Additionally, various thresholds (for example, 85%, 95%, 0.5, 1.5, etc.) discussed above with respect to classification of post frequency and multimedia usage can be varied to other relevant values, as will occur to those skilled in the art. Also, an embodiment of the SMPE can be used to perform evaluations of social media pages under various engagement criteria and parameters. For example, in a simulated scenario when number of fans of a social media page increases, or number of posts increase, and various other conditions. Furthermore, an embodiment of the SMPE can be used repetitively to evaluate the effectiveness of one or more social media pages. Such an embodiment will be useful to compare the effectiveness of social media pages belonging to various users. This, along with various other aspects of the present disclosure will be better understood in screenshots described in FIG. 6A, FIG. 6B, FIG. 7, and FIG. 8.

Now referring to FIG. 5, an exemplary data table 510 (stored in an SMPE database) illustrating various types of information and data stored with respect to a given social media page is shown. As shown, page table 510 comprises various engagement criteria and parameters that represent user involvement and activity related to a social media page. It will be recalled that such criteria and parameters are retrieved by the SMPE from respective SMSs. According to one embodiment, such criteria and parameters are then processed according to the steps described in FIG. 4 to evaluate the effectiveness of published content on social media pages.

As will be understood and appreciated, although embodiments of the present system are described herein in relation to social media pages, it is understood that aspects of the present system are not limited specifically to "pages," but could relate to other social media accounts. For example, the value associated with a TWITTER™ handle or LINKEDIN™ profile can be determined based on the methodologies described herein. Accordingly, aspects of the present system relate to a plurality of social media pages, accounts, and the like as will occur to one of ordinary skill in the art.

Still referring to FIG. 5, results of an exemplary evaluation (also referred to herein as evaluation measures) are also seen in page table 510, in an exemplary column "Results of Evaluation". Such a column further comprises columns that indicate a current monetary value of a social media page as well as a potential monetary value of a page. Those skilled in the art will understand that a potential monetary value of a page corresponds to a monetary value of a page in the event that published content on a page changes, for example, if quality of published content on a page is improved. Details of a process for evaluating a current and potential monetary values of social media pages are described in FIG. 4 above.

As shown in FIG. 5, page table 510 an "Engagement Parameters of Social Media Page" column further comprises columns titled "Time Stamp", "URL", "Posts", "Comments", "Fans", "Likes", and "Posts", each of which lists stored numerical parameters. Additionally, qualitative criteria (that generally have either a "YES" or "NO" value) are also shown in page table 510. Examples of such criteria include whether multimedia tools, such as polls ("Polls" column in FIG. 5), or video clips ("Video Clips" column in FIG. 5) are used in posts published on a social media page. It is also seen in FIG. 5 that a "Results of Evaluation" column further comprise a "Current Monetary Value" column and a "Potential Monetary Value" for illustrative purposes.

Referring now to exemplary data stored in various columns in FIG. 5, various engagement criteria and parameters that represent user involvement and activity related to a social media page will now be explained with an illustrative example. Fictitious social media systems (SMSs) are named as "Eyetext" and "Scribble". Users (private individuals, corporate entities and organizations) access such exemplary SMSs for purposes of publishing new material, editing or reviewing published material on social media pages, etc. It will be understood that "AcmeCoffee", "Walbuy", "Bestmart" are examples of fictitious users who have social media pages. For purposes of this example, it is assumed that "AcmeCoffee" and "Walbuy" own social media pages on exemplary SMS Eyetext, and user "Bestmart" owns a social media page on exemplary SMS "Scribble".

In page table 510, URLs of social media pages of these fictitious users are illustrated exemplarily as "www.eyetext.com/acmecoffee", "www.eyetext.com/walbuy" and "www.scribble.com/bestmart". According to one embodiment, these URLs are stored in an "URL" column in page table 510. It is further seen that number of posts (including links, pictures, messages, coupons, videos, polls, or any type of content) posted by users on social media pages belonging to "AcmeCoffee", "Walbuy", and "Bestmart" are 45, 141 and 209 respectively, i.e. contents of a "Posts" column in FIG. 5. Also, users who have visited social media pages owned by "AcmeCoffee", "Walbuy", and "Bestmart" have provided 15, 3718 and 137 comments (i.e. contents of a "Comments" column in FIG. 5) to posts on such social media pages.

As recited previously, users can choose to be admirers or followers of a social media page. Number of such users are indicated in column "Fans" in FIG. 5. For example, there are 10,552 fans of "Acme Coffee", 689 fans of "Walbuy", and 694 fans of "Bestmart". Moreover, users who have visited social media pages hosted by "AcmeCoffee", "Walbuy", and "Bestmart" can also express their appreciation for content, for example, by clicking on a button on a social media page. Number of such users who have expressed appreciation are available from SMSs. According to an embodiment of the present disclosure, "Likes" column in page table stores such numbers as retrieved from respective SMSs by the SMPE. As shown, number of users who appreciate content on social media pages belonging to "AcmeCoffee", "Walbuy", and "Bestmart" are 216, 178, and 694 respectively.

In addition to numerical engagement parameters, qualitative criteria related to usage of a type of content, such as polls and video clips, in posts on social media pages, are also stored in page table 510. Examples of such columns shown in FIG. 5 are "Polls" and "Video clips". As shown, such columns store either a "YES" or "NO" value. For example, as can be seen from FIG. 5, user "Acme Coffee" does not make usage of polls, but makes use of video clips, in contents published in a page owned by "Acme Coffee" and hosted by "Eyetext". This is indicated with a "NO" entry in "Polls" column, and a "YES" column in "Video Clips." Corresponding exemplary ("YES/NO") entries for users "Walbuy" and "Bestmart" are also indicated in page table 510, as published in social media pages hosted by exemplary SMSs "Eyetext" and "Scribble".

Those skilled in the art will further understand that users wish to evaluate the effectiveness of content published on social media pages that are owned by them, or owned by other users. Thus, as can be seen in FIG. 5 a "Results of Evaluation" column stores results of evaluation of content published on social media pages. It can be also seen that a "Results of Evaluation" further comprise a "Current Monetary Value" column and a "Potential Monetary Value" column. For example, current monetary value of user "Acme Coffee" is $43,920 as evaluated on Mar. 30, 2011 at 11:30 AM (contents of "TimeStamp" column). If current quality of content published in social media page owned by user "Acme Coffee" as hosted on "Eyetext" is improved, then the SMPE 110 estimates that potential monetary value of such a page will increase to "$113,962". Current and potential exemplary monetary values of social media pages of users "Walbuy" and "Bestmart" are also indicated in FIG. 5. According to an embodiment of the present disclosure, a potential monetary value of a social media page can be obtained by manipulating various engagement parameters and criteria, as for example, improvements that will cause an Eng. multiplier to take a higher value, as discussed in FIG. 4. Those skilled in the art will further understand that user engagement and activity can be improved in various other ways, in order to arrive at a potential monetary value of a social media page. Again, it will be understood that the types of data and information shown in page table 510 are presented merely for illustrative purposes only, and other types of data may be included (or excluded). It will be further understood that dates/times (or, in other words, timestamps) when an evaluation is performed is stored in a database so that analytics related to engagement or monetary value of a social media page, at various dates/times can be obtained.

FIG. 6A and FIG. 6B illustrate screenshots 600 and 650 respectively, of an interface of the SMPE displaying results of an exemplary evaluation. As will be understood by a person skilled in the art, such results are displayed to users who wish to evaluate the effectiveness of content published on social media pages that are owned by them, or owned by other users, and hosted on social media systems. Generally, users submit a URL of a social media page to an embodiment of the SMPE. According to an embodiment of the present disclosure, exemplary interfaces as shown in FIG. 6A and FIG. 6B are utilized by users to submit URLs of social media page that is to be evaluated. After receiving a URL of a social media page from an user, the SMPE retrieves information related to various engagement criteria and parameters that represent user involvement and activity related to a respective social media page from a respective SMS. Then, the SMPE processes the retrieved information to perform an evaluation of the respective social media page. Computer-implemented steps involved in an evaluation process, according to an embodiment of the SMPE is discussed in FIG. 4. Interactions involving users, the SMPE and social media systems are shown with an exemplary sequence diagram in FIG. 3. Engagement parameters and criteria along with exemplary results of an evaluation process are shown (stored in a database table) in FIG. 5.

Referring first to FIG. 6A, a user who wishes to evaluate the effectiveness of a social media page submits an URL of a social media page (for example, http://www.eyetext.com/acmecoffee) by typing the URL in region 602. Then, the user clicks on an "Evaluate" button 603 to signal the SMPE to begin evaluation. After receiving the user's inputs, the SMPE validates the URL, and then begins the evaluation process if the submitted URL is a valid URL.

If the URL submitted by a user is a valid URL, the SMPE determines whether the social media page (specified by the URL) has been evaluated earlier by the SMPE. According to one embodiment, in a situation in which the social media page has been evaluated earlier, results of an evaluation pre-stored in a database are retrieved by the SMPE and displayed to the user. If the social media page has not been evaluated previously, an evaluation of the social media page is performed and results of an evaluation are then displayed to an user. In what follows it will be understood that according to one embodiment, results of an evaluation are displayed in four (4) tabs: a "Current Evaluation" tab (screenshot 600 shown in FIG. 6A), a "Fan-tasize" tab (screenshot 650 shown in FIG. 6B), a "Compare with Other Brands" tab (screenshot 700 shown in FIG. 7), and a "Page Value History" tab (screenshot 800 shown in FIG. 8). It will be understood, however, that embodiments of the present system are not limited to such tabs or screen displays.

Starting with FIG. 6A, displayed in a "Current Evaluation" tab, results of an exemplary evaluation of a social media page belonging to a fictitious user "Acme Coffee" are shown in screenshot 600. As will be discussed later, various qualitative and quantitative attributes that characterize engagements and interactions (for example, number of fans as shown in region 610, number of posts as shown in region 612, etc.) by users are displayed as part of results of an evaluation (also referred to herein as a performance measure). According to one embodiment, a monetary value of the social media page is computed, as discussed earlier in FIG. 4, using various qualitative and quantitative attributes that characterize engagements and interactions, some of which are displayed in regions 610, 612, and 614. Furthermore, it will be understood that monetary valuation of a social media page may include statistics of a page collected over a time period. According to one embodiment, such a time period is thirty (30) days, although no such limitation is imposed.

In an example, as shown in FIG. 6A, social media page value of a user "Acme Coffee" on an exemplary SMS "Eyetext" is "$43,920". It can be further seen from region 616 that such an evaluation was performed by the SMPE by assuming an Earned Media value of $5. However, an user who wishes to re-evaluate the respective social media page with a different Earned Media value can do so by moving a slider in region 616 to the left or right, which will decrement or increment the Earned Media value respectively. This will automatically cause re-evaluation of the social media page by the SMPE in real-time and corresponding results to be displayed on an interface. It will be recalled from earlier that an Earned Media value is a numerical quantity that is typically used in online marketing and advertising to measure the cost of an electronic marketing campaign, and its consequent impact on consumers.

According to one embodiment and as shown in FIG. 6A, a slider in region 616 moves from a minimum Earned Media value of $1 to a maximum Earned Media of $25. However, as will occur to those skilled in the art, no such limitation is imposed. In other embodiments, an Earned Media value can be entered by a user on a graphical user interface element, for example typed in a text box, or, selected using a check box, or, selected using radio buttons, etc.

In addition to computing a current monetary value of a page, an embodiment of the SMPE also computes a potential (or maximum) monetary value associated with a given page, for example using processes as discussed in FIG. 4. Region 618 in screenshot 600 displays evaluation of current and potential monetary values of a social media page in the form of bar graphs. As seen, current value of a social media page owned by "Acme Coffee" is "$43,920". However, by improving quality of content published on this page will potentially result in increased engagements and interactions by users, which can lead to a potential monetary value of this page to be "$113,962". As will be understood, the potential or maximum value for a given page can be determined by manipulating the inputs to an evaluation process (e.g., process 400 shown in FIG. 4) to correlate to increased user engagement, such as increased post frequency, increase in use of social media content on the page, etc. As will be further understood and appreciated, other reporting and analytical tools, such as line diagrams, number displays, and the like may be used as opposed to a bar graph.

As explained earlier, a user can choose to evaluate a social media page based on an Earned Media value that the user desires. It will be understood and appreciated that if the user changes an Earned Media value (for example, by moving a slider in region 616 to the left or to the right), current and potential monetary values of a social media page are re-computed. As a result, the bar graphs shown in region 618 re-adjust automatically to correspond to the re-computed monetary values. It will be understood that a default Earned Media value is typically used as a starting point.

Still referring to FIG. 6A, a date when evaluation of a social media page is performed is also indicated, for example "Mar. 30, 2011". According to an embodiment, a user can request re-evaluation of a social media page by clicking on a "Request Re-evaluation" button 608. This will cause re-evaluation of the social media page and results to be re-displayed, which is not shown here.

A "Fans" region 610 displays a number of fans (admirers) for a social media page belonging to a social media page owner. As shown, "Acme Coffee" has "10,552" fans. Also, number of posts posted on a respective social media page is indicated by a "Page Posts" region 612. It is seen that the social media page owned by "Acme Coffee" has "45" posts. Further, it is also seen that number of interactions (i.e. "Interactions" region 614) is 231. According to one embodiment, number of interactions is defined as a sum of number of comments and a number of likes. As will be recalled, comments represent a number of users who have commented on posts by other users. Posts can include messages, audio clips, video clips, pictures, polls, quizzes, or any other multimedia material. Likes represent a number of users who have expressed appreciation for posts posted by other users.

In addition to quantitative attributes, results of an evaluation (also referred to herein as an evaluation measure) of a social media page by the SMPE also comprises various qualitative attributes. Such attributes by way of example, include but are not limited to, "User Engagement", "Multimedia Usage", "Risky URL Shortener Usage". In FIG. 6, these are exemplarily displayed in regions 620, 622, and 624 respectively.

Generally, Post Frequency is indicative of the number of posts per day on a social media page, averaged over a time period. As will be understood by one of ordinary skill in the art, post frequency is representative of user engagement (exemplarily shown in region 620 in FIG. 6). It will be further understood that if social media page users posts too frequently, then fans and other users who subscribe to a social media page will be overwhelmed with a large number of posts, and consequently, they will start ignoring content, which, in turn, will lower levels of user engagement. On the other hand, if a social media page does not contain enough posts, other users and fans will not be engaged enough, which will also lower user engagement levels. Thus, it will be appreciated that posting too much or too little can result in reduced engagements of users in a social media page. In other words, a high post frequency does not necessarily correspond to a high levels of user engagement.

Furthermore, those skilled in the art will understand and appreciate that quantitative statistics such as Post Frequency can be classified into various predetermined levels that signify user engagement. For example, if Post Frequency is between 1.5 and 2.5, then a "High" user engagement will be indicated in an outcome of an evaluation process. Or, if the post frequency is between 0.5 and 1.5, then a "Medium" user engagement will be indicated in an outcome of an evaluation process. Additionally, if Post Frequency is greater than 2.5, or in another instance, Post Frequency is less than 0.5, low levels of user engagement is indicated by the SMPE in an outcome of an evaluation process. Thus, it will be appreciated that posting too much or too little can result in reduced engagements of users in a social media page. As shown in FIG. 6A, region 620 displays user engagement of "Acme Coffee" as low because the SMPE evaluates that either posts are too frequent (high post frequency), or not enough (low post frequency).

In another embodiment of the SMPE, frequency of usage of multimedia tools in posts is computed from posts on a social media page. For example, if greater than 95% of posts in the past thirty days contained multimedia attachments, then a "High" frequency of multimedia usage is indicated. Generally, it will be understood that rich, meaningful content in posts can be important to promote interaction among users of a social page Alternatively, if multimedia attachments are present between 85% and 95% of the posts, then a "Medium" frequency of multimedia usage is indicated. Even further, if 85% or lesser proportion of posts contain multimedia attachments, then a "Low" frequency of multimedia usage is indicated. As shown in region 622, multimedia usage for a social media page owned by "Acme Coffee" is high, which is indicative of increased interactions among users of the social media page. As will be understood from the foregoing discussion, effective social media pages include content involving usage of a moderate frequency of relevant (for example, not containing bad links) and interesting posts (for example, using various multimedia tools such as video clips, audio clips, polls, etc.).

As discussed earlier in FIG. 4, usage of third party URL shorteners determines an evaluation of a social media page. For example, if risky third party URL shorteners are included in posts on a social media page, then a "High" risk level is indicated in the results of an evaluation (also referred to herein as evaluation measures). As will be recalled, this is because URLs shortened by such URL shorteners are prone to be hacked or exposed to a user's competitors. On the contrary, for example, if a social media page employs a custom brand shortener that is brand-specific, and not affiliated with a third party, then a "low" risk level is indicated. Region 624 in FIG. 6A displays that risk involved with using URL shorteners for posts (including URLs) on a social page belonging to "Acme Coffee" is low.

In addition to various qualitative and quantitative attributes (related to a social media page) that are displayed in screenshot 600 and discussed above, region 626 in the same screenshot displays a drop-down "Best Practices" menu. Although this menu has not been expanded in the screenshot, it will be understood that the SMPE provides general recommendations on best practices for an effective social media page to users reviewing this menu. Examples of best practices include, cross-linking multiple social media pages for users who own multiple social media pages, or providing complete information about a social media page as required by a social media system that hosts a social media page. Further examples of best practices include posting content at specific times of the day so that a social media page has a high likelihood of being reviewed by users, eliminating spam and obscenities in posts, and various other recommendations that will enhance the effectiveness of a social media page, as will occur to those skilled in the art. It can also be seen from FIG. 6A that tabs 650, 700, and 800 display further results of evaluation of a social media page. These will be described in detail in FIG. 6B, FIG. 7, and FIG. 8 respectively. FIG. 6B is described next with an exemplary screenshot 650.

In FIG. 6B, a screenshot 650 (named exemplarily as a "Fan-tasize" tab) of an interface is displayed that allows a user to evaluate a social media page by simulating different scenarios of user engagements and interactions. According to one embodiment, various engagement parameters and criteria on a social media page are adjusted (simulated) to obtain a social media page's monetary value, both as a current monetary value as well as a potential monetary value of a social page. As discussed previously in connection with FIG. 4 and FIG. 6A, engagement parameters such as number of posts, number of fans, and criteria such as user engagement influence a monetary value of a page. In one embodiment of the SMPE, post frequency ("Post Frequency"), user engagement ("User Engagement"), and fan count ("Fan Count") are used to evaluate a monetary value of a social media page. Accordingly, region 652 in the interface shown in FIG. 6B allows a user to adjust post frequency and user engagement to hypothetical values, using a slider control. Since interactions involving fans of a social media page are considered more valuable (i.e. greater engagement) than users who are non-fans, a "Fan count" box in region 652, can also be changed to number of fans of a social media page, according to a user's preference.

As can be seen in FIG. 6B, region 652 indicates that on a social media page belonging to hypothetical user "Acme Coffee", the "Post Frequency" is "5", "Engagement" is "High", and "Fan Count" is "10,552". As noted previously, post frequency is representative of user engagement. Generally speaking, user engagement is considered as a mean value indicative of how likely users are to interact with a social media page. However, a "High" post frequency does not necessarily correspond to "High" user engagement. In other words, posting too much or too little can result in reduced engagements of users in a social media page. This is because in an exemplary scenario, if social media page users posts too frequently, then fans and other users who subscribe to a social media page will be overwhelmed with a large number of posts, and consequently, they will start ignoring content, which, in turn, will lower levels of user engagement. On the other hand, if a social media pages do not contain enough posts, other users and fans will not be engaged enough, which will also lower user engagement levels.

Thus, if "Post Frequency" slider is set too high, for example, "5" as shown in region 652, user engagement may be lowered. According to one embodiment, the SMPE displays a message "May Lower Engagement" to users who set "Post Frequency" too high in an exemplary simulation scenario. It will be further understood that according to one aspect of the present disclosure, altering engagement attributes and parameters such as "Post Frequency", "User Engagement" or "Fan Count" has an effect on results of an evaluation process. According to one embodiment, this effect is captured in an "Eng. multiplier" quantity discussed in connection with FIG. 4. Accordingly, monetary value of a social media page is re-computed by the SMPE, and re-computed results of an evaluation will be displayed on a user's screen. As a result, bar graphs shown in region 618 re-adjust automatically to correspond to re-computed monetary values. Further, as will be understood and appreciated, embodiments of the SMPE may utilize various other numerical and non-numerical parameters and criteria extracted from social media pages hosted by a variety of social media systems, and those discussed herein are for illustrative purposes only. It will be also understood that effects of change in engagement parameters and criteria (exemplarily shown on screenshot 650 as "Post Frequency", "User Engagement" or "Fan Count", and several others) can be captured by other numerical or non-numerical quantities, that may not be necessarily related to any variable or quantities discussed herein.

Now referring to FIG. 7, an exemplary screenshot 700 illustrating system functionality that enables comparison of evaluations of multiple (in this example, three (3)) social media pages is shown. According to one embodiment, such evaluations involve comparison of current and potential monetary values (or other evaluation measures) of one or more social media pages. In one embodiment, such monetary values are computed according to an evaluation process (a/k/a social media page evaluation algorithm) described in connection with FIG. 4. It will be recalled that a potential monetary value is computed under the assumption that various engagement criteria and parameters indicating user involvement has improved, for example, by enhancing the quality of published content on a social media page.

As seen in FIG. 7, region 701 displays current and potential monetary values of three (3) social media pages hosted on an exemplary social media system "Eyetext". According to one embodiment, a user enters URLs of social media pages that are to be compared in boxes 702, 704, and 706 as shown in FIG. 7. For example, three users "Acme Coffee", "John Doe" and "Walbuy" own fictitious social media pages given as "http://www.eyetext.com/acmecoffee", "http://www.eyetext.com/johndoe", and "http://www.eyetext.com/walbuy". A user who wishes to evaluate the effectiveness of these social media pages enters these URLs through an interface and clicks on "Compare" button 708. After receiving a user's inputs, the SMPE validates the URLs, and then begins the evaluation process if the submitted URLs are valid URLs.

If all the URLs submitted by a user are valid URLs, the SMPE begins the evaluation process, and then displays results of an evaluation on the user's screen. According to one embodiment, an evaluation process involves computing current and potential values of social media pages corresponding to the above mentioned URLs. In other embodiments, the values are determined for a social media account (not simply a URL), or information relating to the URL (such as a brand name or owner name or other product-related information, etc.), or a social media "handle" or title, etc. As shown in FIG. 7, current and potential monetary values of "Acme Coffee" are "$43,920" and "$113,962" respectively. Also, user "John Doe" has a current and potential monetary value of "$31,720" and $82,432". It can also be seen from FIG. 7 that user "Walbuy" has a current and potential monetary value of "$40,550" and "$103,232" respectively. Generally, a social media page associated with a company or brand will have a much higher value than an individual user's page. In this example, however, it can be assumed that John Doe is a celebrity or politician or the like, thus leading to a large fan following and increased engagement value for his page. It will be understood by one skilled in the art that various engagement criteria and parameters influence current and potential monetary value of a social media page, for example as described in FIG. 4. However, it will be understood that an evaluation process can involve displaying various other outcomes (related or unrelated to monetary value(s) of social media pages) that depend on engagement criteria and parameters, signifying user activities and involvements on a social media page.

One skilled in the art will understand and appreciate that an embodiment of the SMPE can be used to compare multiple social media pages, and is not limited to three social media pages as discussed in FIG. 7. An embodiment of the SMPE can store engagement parameters and criteria along with corresponding outcomes/results of an evaluation process, in a database (for example, SMPE database). If a social media page is repeatedly evaluated on multiple dates/times, then updates in engagement parameters and criteria (if any) are also stored along with corresponding outcomes. As a result, such pre-stored evaluations (along with other relevant user activity data, as necessary) can be used to compute various analytics and statistics. Exemplary statistics and analytics in connection with user activity and involvement on a social media page, will be described next.

Turning now to FIG. 8, an exemplary screenshot showing various statistics and analytics related to evaluation of a social media page is shown. According to one embodiment, such statistics and analytics involves computing a current monetary value and a potential monetary value of a social media page. Those skilled in the art will understand and appreciate that users who wish to evaluate the effectiveness of a social media page can use an embodiment of the SMPE to evaluate a social media page owned by them or owned by other users. Further, as shown in FIG. 7, users can also compare evaluations of multiple social media pages. An exemplary evaluation process performed by the SMPE is described in FIG. 4. An evaluation process depends on various engagement parameters and criteria extracted from social media pages, hosted by social media systems. Examples of various engagement parameters include number of posts, number of fans, number of comments, and many others. FIG. 5 shows a data table storing various engagement parameters and criteria, in an exemplary database.

As can be seen in region 802, current and potential monetary values of a social monetary page belonging to a fictitious user "Acme Coffee", as evaluated on different dates, is displayed as points on a line graph. In the example shown, a lower graph displays a current monetary value with data points marked as crossed-circles. An upper graph displays a potential monetary value with data points marked as diamonds. A horizontal axis (i.e., commonly referred to as X-axis) on the displayed graphs indicates different dates when evaluation was performed, for example 03/05, 03/10, 03/30 and so on. A vertical axis (i.e., commonly referred to as Y-axis) indicates monetary values of social media pages, corresponding to a current monetary value and a potential monetary value. In one embodiment, a potential monetary value of a social media page is estimated based on an assumption of improved quality of content published in a social media page. An exemplary method of estimating a current and a potential monetary value of a social media page is described in connection with FIG. 4. It will be further understood that various analytics described in FIG. 8 are for illustrative purposes only, and other analytics and statistical quantities for example, mean, median, mode, variance, etc. can be computed according to various embodiments of the present system. Further, data displays as shown in FIG. 8 are for purposes of illustration only. Other embodiments can use different visualization tools such bar graphs, or other plots, involving data points indicated by different types of markers and/or colors. Additional analysis can involve various statistical models, for example, Gaussian distribution or other statistical distribution functions applied to user-activity data or outcomes of evaluation (also referred to herein as evaluation measures). Even further, regression models can be employed to obtain for example, a line of best fit, etc.

As described in detail above, aspects of the present disclosure generally relate to systems and methods for evaluating social media pages belonging to users and containing various content (e.g., messages, audio clips, video clips, polls, quizzes, etc.) using a social media page evaluator (SMPE). It will be understood and appreciated that according to one embodiment, users who wish to evaluate a social media page owned by them or by other users communicates with the SMPE easily via a user interface over a computer network, such as the World Wide Web (WWW), using varying types of electronic devices such as smart phones and computers. In one embodiment, the SMPE receives an URL of a social media page from a user, and performs an evaluation process involving various computer-implemented steps. This evaluation usually entails communication with a social media system that hosts a social media page in order to extract information associated with the social media page that corresponds to the user-submitted URL. Additionally, aspects of the present disclosure involve several computations in an evaluation process and further reporting results of such an evaluation to users, along with various analytics related to content published in social media pages.

Accordingly, it will be understood from the foregoing description that various embodiments of the present system described herein are generally implemented as a special purpose or general-purpose computer including various computer hardware as discussed in greater detail below. Embodiments within the scope of the present disclosure also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, the present disclosure is described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the present disclosure may be practiced in network computing environments with many types of computer system configurations, including personal computers, hand-held devices, multi-processor systems, microprocessor-based or programmable consumer electronics, networked PCs, minicomputers, mainframe computers, and the like. The present disclosure is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the present disclosure, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the present disclosure will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which aspects of the present disclosure are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the present disclosure is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present disclosure, it readily will be understood by those persons skilled in the art that the present disclosure is susceptible to broad utility and application.

While various aspects have been described in the context of a preferred embodiment, additional aspects, features, and methodologies of the present disclosure will be readily discernable from the description herein, by those of ordinary skill in the art. Many embodiments and adaptations of the present disclosure other than those herein described, as well as many variations, modifications, and equivalent arrangements and methodologies, will be apparent from or reasonably suggested by the present disclosure and the foregoing description thereof, without departing from the substance or scope of the present disclosure. Furthermore, any sequence(s) and/or temporal order of steps of various processes described and claimed herein are those considered to be the best mode contemplated for carrying out the present disclosure. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present disclosure. In addition, some steps may be carried out simultaneously.

Accordingly, while the present disclosure has been described herein in detail in relation to preferred embodiments, it is to be understood that this disclosure is only illustrative and exemplary of the present disclosure and is made merely for purposes of providing a full and enabling disclosure. The foregoing disclosure is not intended nor is to be construed to limit the present disclosure or otherwise to exclude any such other embodiments, adaptations, variations, modifications and equivalent arrangements, the present disclosure being limited only by the claims appended hereto and the equivalents thereof.

What is claimed is:

1. A computer-implemented method for determining effectiveness of social media pages hosted by one or more social media systems using content associated with the social media pages and user interaction with the social media pages, comprising the steps of:
    configuring a database table comprising:
        a first set of columns storing at least engagement information, wherein the engagement information comprises a number of users engaged with a social media page and one or more engagement parameters associated with user involvement with respect to the social media page, and
        a second set of columns storing values derived from the first set of columns, wherein the second set of columns are continuously updated based at least in part on adjustments of values of the first set of columns, and wherein the values derived from the first set of columns and stored in the second set of columns are at least evaluation measures;
    receiving a request for evaluation of a respective social media page maintained within a respective social media system, the respective social media page comprising one or more types of content for dissemination;
    querying the respective social media system for retrieval of engagement information corresponding to the respective social media page;
    receiving a response from the respective social media system comprising the engagement information associated with the respective social media page;
    storing, in the first set of columns in the database table, the engagement information from the respective social media system, wherein the first set of columns further comprises a timestamp column indicating a time an evaluation is performed and a URL corresponding to the respective social media page being evaluated;
    generating one or more evaluation measures corresponding to the respective social media page, wherein data from the first set of columns in the database table corresponding to the respective social media page are processed to generate values for the second set of columns, and wherein at least one evaluation measure of the one or more evaluation measures is processed based at least in part on:
        a number of users engaged with the respective social media page,
        an engagement multiplier indicating a level of engagement of the users relative to an amount of content posted on the social media page, the engagement multiplier is based at least in part upon the one or more engagement parameters retrieved from the first set of columns in the database table, the engagement parameters comprising a number of likes, a number of comments, a number of fans, and a number of posts on the respective social media page, and
        a selected earned media value representing an advertising cost of a social media interaction;
    storing, in the second set of columns in the database table, the one or more evaluation measures corresponding to the respective social media page; and
    generating a graphical user interface comprising the one or more evaluation measures from the first set of columns in the database table, the one or more engagement parameters from the second set of columns in the database table, and one or more user input controls to receive user input adjusting one or more engagement parameters from the first set of columns to re-compute the one or more evaluation measures of the second set of columns.

2. The method of claim 1, wherein the request for evaluation of the respective social media page is initiated by a social media system user.

3. The method of claim 1, further comprising the step of, after the request for evaluation of the respective social media page has been received, determining whether an evaluation has been previously generated for the respective social media page.

4. The method of claim 3, further comprising the step of, if an evaluation has been previously generated for the respective social media page, retrieving the previously-generated evaluation for subsequent use.

5. The method of claim 1, wherein the earned media value is a cost-per-thousand-view (CPM).

6. The method of claim 1, wherein the engagement information is selected from the group consisting of fan count, follower count, number of users of the respective social media page, post count, message count, comment count, like count, re-post count, overall interactions, presence of multimedia content, presence of application media content, presence of URL modifiers, presence of questionable fan or user activity, user-related information, and qualitative content analytics.

7. The method of claim 1, further comprising using the retrieved engagement information to calculate a quantitative assessment.

8. The method of claim 1, further comprising using the retrieved engagement information to calculate a qualitative assessment.

9. The method of claim 1, further comprising using the retrieved engagement information to calculate recommendations for modifying social media page content.

10. The method of claim 1, further comprising the step of storing the received engagement information for subsequent use.

11. The method of claim 1, wherein the one or more types of content comprises a blog.

12. The method of claim 1, wherein an action that may be taken with respect to the respective social media page is taken by an owner of the respective social media page, and selected from the group consisting of modifying content published on the respective social media page, increasing or decreasing frequency of posts or messages on the respective social media page, simulating changes in engagement information, and subjecting the evaluation measure to further processing.

13. The method of claim 1, wherein the one or more engagement parameters are selected from the group consisting of like count, comment count, post count, fan post count, and fan count.

14. A computer program product comprising a non-transitory computer readable storage medium embodying one or more instructions executable by a computer to perform a process for determining effectiveness of social media pages hosted by one or more social media systems using content associated with the social media pages and user interaction with the social media pages, the process comprising configuring a database table comprising a first set of columns storing at least engagement information, wherein the engagement information comprises a number of users engaged with a social media page and one or more engagement parameters associated with user involvement with respect to the social media page, and a second set of columns storing values derived from the first set of columns, wherein the second set of columns are continuously updated based at least in part on adjustments of values of the first set of columns, and wherein the values derived from the first set of columns and stored in the second set of columns are at least evaluation measures; receiving a request for evaluation of a respective social media page maintained within a respective social media system, the respective social media page comprising one or more types of content for dissemination; querying the respective social media system for retrieval of engagement information corresponding to the respective social media page; receiving a response from the respective social media system comprising the engagement information associated with the respective social media page; storing, in the first set of columns in the database table, the engagement information from the respective social media system, wherein the first set of columns further comprises a timestamp column indicating a time an evaluation is performed and a URL corresponding to the respective social media page being evaluated; generating one or more evaluation measures corresponding to the respective social media page, wherein data from the first set of columns in the database table corresponding to the respective social media page are processed to generate values for the second set of columns, and wherein at least one evaluation measure of the one or more evaluation measures is processed based at least in part on: a number of users engaged with the respective social media page, an engagement multiplier indicating a level of engagement of the users relative to an amount of content posted on the social media page, the engagement multiplier is based at least in part upon the one or more engagement parameters retrieved from the first set of columns in the database table, the engagement parameters comprising a number of likes, a number of comments, a number of fans, and a number of posts on the respective social media page, and a selected earned media value representing an advertising cost of a social media interaction; storing, in the second set of columns in the database table, the one or more evaluation measures corresponding to the respective social media page; and generating a graphical user interface comprising the one or more evaluation measures from the first set of columns in the database table, the one or more engagement parameters from the second set of columns in the database table, and one or more user input controls to receive user input adjusting one or more engagement parameters from the first set of columns to re-compute the one or more evaluation measures of the second set of columns.

15. A system for determining effectiveness of a social media page hosted by a social media system using content associated with the social media page and user interaction with the social media page, comprising:
 a social media page evaluator (SMPE) configured to determine effectiveness of a social media page;
 one or more social media systems (SMSs) that display content to one or more SMSs members;
 a communication link that operatively couples the SMPE to the one or more SMSs;
 a database for storing SMPE content; and
 an SMPE processor that performs the steps of:
 configuring a database table comprising:
  a first set of columns storing at least engagement information, wherein the engagement information comprises a number of users engaged with a social media page and one or more engagement parameters associated with user involvement with respect to the social media page, and
  a second set of columns storing values derived from the first set of columns, wherein the second set of columns are continuously updated based at least in part on adjustments of values of the first set of columns, and wherein the values derived from the first set of columns and stored in the second set of columns are at least evaluation measures;
 receiving a request for evaluation of a respective social media page maintained within a respective SMS, the respective social media page comprising one or more types of content for dissemination;
 querying the respective SMS for retrieval of engagement information corresponding to the respective social media page;
 receiving a response from the respective SMS comprising the engagement information associated with the social media page;
 generating one or more evaluation measures corresponding to the respective social media page, wherein data from the first set of columns in the database table corresponding to the respective social media page are processed to generate values for the second set of columns, and wherein at least one evaluation measure of the one or more evaluation measures is processed based at least in part on:
  a number of users engaged with the respective social media page,
  an engagement multiplier indicating a level of engagement of the users relative to an amount of content posted on the social media page, the engagement multiplier is based at least in part upon the one or more engagement parameters retrieved from the first set of columns in the database table, the engagement parameters comprising a number of likes, a number of comments, a number of fans, and a number of posts on the respective social media page, and a selected earned media value representing an advertising cost of a social media interaction;

storing, in the second set of columns in the database table, the one or more evaluation measures corresponding to the respective social media page; and generating a graphical user interface comprising the one or more evaluation measures from the first set of columns in the database table, the one or more engagement parameters from the second set of columns in the database table, and one or more user input controls to receive user input adjusting one or more engagement parameters from the first set of columns to re-compute the one or more evaluation measures of the second set of columns.

16. A computer implemented method for evaluating social media pages hosted on social media systems via a social media page evaluator (SMPE) maintained at a server, for purposes of evaluating effectiveness of published content on social media pages, comprising the steps of:

configuring a database table comprising:

a first set of columns storing at least engagement information, wherein the engagement information comprises a number of users engaged with a social media page and one or more engagement parameters associated with user involvement with respect to the social media page, and a second set of columns storing values derived from the first set of columns, wherein the second set of columns are continuously updated based at least in part on adjustments of values of the first set of columns, and wherein the values derived from the first set of columns and stored in the second set of columns are at least evaluation measures;

receiving via an interface on a user's computing device an identifying address of a respective social media page to be evaluated from the user who wishes to evaluate the respective social media page, the respective social media page comprising one or more types of content for dissemination;

communicating with a social media system (SMS) associated with the respective social media page to be evaluated based on the identifying address of the respective social media page to retrieve one or more attributes in connection with the respective social media page to be evaluated, wherein the retrieved one or more attributes comprise engagement parameters representative of user involvement on the respective social media page;

at the SMPE, storing, in the first set of columns in the database table, the engagement information from the respective social media system, wherein the first set of columns further comprises a timestamp column indicating a time an evaluation is performed and a URL corresponding to the respective social media page being evaluated;

at the SMPE, processing the retrieved one or more attributes via a social media page evaluation algorithm to generate qualitative or quantitative assessments of the respective social media page, wherein data from the first set of columns in the database table corresponding to the respective social media page are processed to generate values for the second set of columns, and wherein the qualitative or quantitative assessments of the respective social media page include one or more evaluation measures of the respective social media page, the one or more evaluation measures are based at least in part on:

a number of users engaged with the respective social media page, an engagement multiplier indicating a level of engagement of the users relative to an amount of content posted on the social media page, the engagement multiplier is based at least in part upon the one or more engagement parameters retrieved from the first set of columns in the database table, the engagement parameters comprising a number of likes, a number of comments, a number of fans, and a number of posts on the respective social media page, and a selected earned media value representing an advertising cost of a social media interaction; and providing the qualitative or quantitative assessments of the respective social media page to the user for subsequent use.

17. The method of claim 16, wherein the step of communicating with a SMS occurs via an application programming interface (API).

18. The method of claim 16, wherein the earned media value is a cost-per-thousand-views (CPM).

19. The method of claim 16, wherein the quantitative assessment generated by the social media page evaluation algorithm comprises a potential evaluation measure of the respective social media page based on improved attributes.

20. The method of claim 16, wherein the quantitative assessment generated by the social media page evaluation algorithm takes into account the earned media value associated with the respective social media page.

21. The method of claim 16, further comprising the step of creating one or more reports comprising the qualitative or quantitative assessments of the respective social media page.

22. The method of claim 21, wherein the one or more reports comprise analytics representative of user interaction on the respective social media page.

23. The method of claim 16, wherein the engagement parameters include qualitative and quantitative parameters.

24. The method of claim 16, wherein the engagement parameters are selected from the group consisting of fan count, follower count, number of users of the respective social media page, post count, message count, comment count, like count, repost count, overall interactions, presence of multimedia content, presence of application media content, presence of URL modifiers, presence of questionable fan or user activity, and user-related information, qualitative content analytics.

25. The method of claim 16, wherein the one or more types of content is a blog.

26. A computer program product comprising a non-transitory computer readable storage medium embodying one or more instructions executable by a computer to perform a process for evaluating social media pages hosted on social media systems via a social media page evaluator (SMPE) maintained at a server, for purposes of evaluating effectiveness of published content on social media pages, the process comprising configuring a database table comprising a first set of columns storing at least engagement information, wherein the engagement information comprises a number of users engaged with a social media page and one or more engagement parameters associated with user involvement with respect to the social media page, and a second set of columns storing values derived from the first set of columns, wherein the second set of columns are continuously updated based at least in part on adjustments of values of the first set of columns, and wherein the values derived from the first set of columns and stored in the second set of columns are at least evaluation measures; receiving via an interface on a user's computing device an identifying address of a respective social media page to be evaluated from the user who wishes to evaluate the respective social media page, the respective social media page comprising one or more types of content for dissemination; communicating with a social media system (SMS) associated with the respective social media page to be evaluated based on the identifying address of the respective social media page to retrieve one or more attributes in connection with the respective social media page to be evaluated, wherein the retrieved one or more attributes comprise engagement parameters representative of user involvement on the respective social media page; at the SMPE, storing, in the first set of columns in the database table, the engagement information from the respective social media system, wherein the first set of columns further comprises a timestamp column indicating a time an evaluation is performed and a URL corresponding to the respective social media page being evaluated; at the SMPE, processing the retrieved one or more attributes via a social media page evaluation algorithm to generate qualitative or quantitative assessments of the respective social media page, wherein data from the first set of columns in the database table corresponding to the respective social media page are processed to generate values for the second set of columns, and wherein the qualitative or quantitative assessments of the respective social media page include one or more evaluation measures of the respective social media page, the one or more evaluation measures are based at least in part on: a number of users engaged with the respective social media page, an engagement multiplier indicating a level of engagement of the users relative to an amount of content posted on the social media page, the engagement multiplier is based at least in part upon the one or more engagement parameters retrieved from the first set of columns in the database table, the engagement parameters comprising a number of likes, a number of comments, a number of fans, and a number of posts on the respective social media page, and a selected earned media value representing an advertising cost of a social media interaction; and providing the qualitative or quantitative assessments of the respective social media page to the user for subsequent use.

27. A system for evaluating effectiveness of published content on a social media page, comprising:
a social media page evaluator (SMPE) maintained at a server and configured to evaluate effectiveness of published content on a social media page;
one or more social media systems (SMSs) that display content to one or more SMSs members;
a user's computing device comprising an interface;
a communication link that operatively couples the SMPE, the one or more SMSs, and the user's computing device to each other;
a database for storing SMPE content; and
an SMPE processor that performs the steps of:
configuring a database table comprising:
a first set of columns storing at least engagement information, wherein the engagement information comprises a number of users engaged with a social media page and one or more engagement parameters associated with user involvement with respect to the social media page, and
a second set of columns storing values derived from the first set of columns, wherein the second set of columns are continuously updated based at least in part on adjustments of values of the first set of columns, and wherein the values derived from the first set of columns and stored in the second set of columns are at least evaluation measures;
receiving via an interface on a user's computing device an identifying address of a respective social media page to be evaluated from the user who wishes to evaluate the respective social media page, the respective social media page comprising one or more types of content for dissemination;
communicating with the respective SMS associated with the respective social media page to be evaluated based on the identifying address of the social media page to retrieve one or more attributes in connection with the social media page to be evaluated, wherein the retrieved one or more attributes comprise engagement parameters representative of user involvement on the respective social media page;
at the SMPE, storing, in the first set of columns in the database table, the engagement information from the respective social media system, wherein the first set of columns further comprises a timestamp column indicating a time an evaluation is performed and a URL corresponding to the respective social media page being evaluated;
at the SMPE, processing the retrieved one or more attributes via a social media page evaluation algorithm to generate qualitative or quantitative assessments of the social media page, wherein data from the first set of columns in the database table corresponding to the respective social media page are processed to generate values for the second set of columns, and wherein the qualitative or quantitative assessments of the respective social media page include one or more evaluation measures of the respective social media page, the one or more evaluation measures are based at least in part on:
a number of users engaged with the respective social media page,
an engagement multiplier indicating a level of engagement of the users relative to an amount of content posted on the social media page, the engagement multiplier is based at least in part upon the one or more engagement parameters retrieved from the first set of columns in the database table, the engagement parameters comprising a number of likes, a number of comments, a number of fans, and a number of posts on the respective social media page, and
a selected earned media value representing an advertising cost of a social media interaction; and
providing the qualitative or quantitative assessments of the social media page to the user for subsequent use.

\* \* \* \* \*

UNITED STATES PATENT AND TRADEMARK OFFICE
CERTIFICATE OF CORRECTION

PATENT NO. : 9,704,165 B2
APPLICATION NO. : 13/105713
DATED : July 11, 2017
INVENTOR(S) : Anderson et al.

Page 1 of 1

It is certified that error appears in the above-identified patent and that said Letters Patent is hereby corrected as shown below:

On the Title Page

On page 3, Column 1, item (56), under Other Publications, Line 36, delete "Plubins" and insert -- Plugins --, therefor.

In the Drawings

On sheet 9 of 9, in FIG. 8, under Reference Numeral 802, Line 2, delete "EXETEXT" and insert -- EYETEXT --, therefor.

In the Specification

In Column 8, Line 55, delete "colleted" and insert -- collected --, therefor.

In Column 16, Line 32, after "page" insert -- . --.

In Column 29, Line 4, delete "discernable" and insert -- discernible --, therefor.

Signed and Sealed this
Fourth Day of September, 2018

Andrei Iancu
*Director of the United States Patent and Trademark Office*